United States Patent [19]
Walter et al.

[11] Patent Number: 5,992,570
[45] Date of Patent: Nov. 30, 1999

[54] SELF-SERVICE CHECKOUT APPARATUS

[75] Inventors: Joanne S. Walter, Alpharetta, Ga.; Alfred J. Hutcheon, Monifieth, United Kingdom; Horng-Jaan Lin, Lawrenceville; Edward F. Madigan, Jr., Alburn, both of Ga.

[73] Assignee: NCR Corporation, Dayton, Ohio

[21] Appl. No.: 08/925,698

[22] Filed: Sep. 9, 1997

Related U.S. Application Data

[63] Continuation of application No. 08/658,420, Jun. 5, 1996, abandoned.

[51] Int. Cl.$^6$ ......................................................... A47F 9/04
[52] U.S. Cl. .................................. 186/36; 186/37; 186/61
[58] Field of Search ................................ 186/36, 37, 52, 186/59, 60, 61, 62, 68; 235/383

[56] References Cited

U.S. PATENT DOCUMENTS

| | | |
|---|---|---|
| 3,688,873 | 9/1972 | Potrafke . |
| 3,878,365 | 4/1975 | Schwartz . |
| 4,177,880 | 12/1979 | Joseloff . |
| 4,236,604 | 12/1980 | Warner ....................................... 186/61 |
| 4,373,133 | 2/1983 | Clyne et al. .............................. 235/383 |
| 4,583,083 | 4/1986 | Bogasky . |
| 4,583,619 | 4/1986 | Fry ............................................. 186/59 |
| 4,676,343 | 6/1987 | Humble et al. ............................ 186/61 |
| 4,766,296 | 8/1988 | Barth ........................................ 235/383 |
| 4,779,706 | 10/1988 | Mergenthaler ............................. 186/61 |
| 4,787,467 | 11/1988 | Johnson ............................... 235/383 X |
| 4,792,018 | 12/1988 | Humble et al. ............................ 186/61 |
| 4,909,356 | 3/1990 | Rimondi et al. ........................... 186/61 |
| 4,940,116 | 7/1990 | O'Connor et al. ......................... 186/61 |
| 4,959,530 | 9/1990 | O'Connor ................................ 235/383 |
| 4,964,053 | 10/1990 | Humble ................................. 186/61 X |
| 5,083,638 | 1/1992 | Schneider .................................. 186/61 |
| 5,115,888 | 5/1992 | Schneider .................................. 186/61 |
| 5,121,103 | 6/1992 | Minasy et al. . |
| 5,123,494 | 6/1992 | Schneider . |
| 5,125,465 | 6/1992 | Schneider ............................. 186/61 X |
| 5,168,961 | 12/1992 | Schneider .................................. 186/52 |
| 5,191,749 | 3/1993 | Cappi et al. ........................... 186/59 X |
| 5,340,970 | 8/1994 | Wolfe, Jr. et al. ...................... 235/383 |
| 5,424,521 | 6/1995 | Wolfe, Jr. et al. ...................... 235/383 |
| 5,426,282 | 6/1995 | Humble ................................. 186/61 X |
| 5,437,346 | 8/1995 | Dumont ..................................... 186/61 |
| 5,482,139 | 1/1996 | Rivalto ...................................... 186/36 |
| 5,540,301 | 7/1996 | Dumont ..................................... 186/61 |
| 5,609,223 | 3/1997 | Iizaka et al. .............................. 186/61 |

FOREIGN PATENT DOCUMENTS

| | | |
|---|---|---|
| 0491348 | 6/1992 | European Pat. Off. . |
| 2125869 | 12/1972 | Germany ................................. 186/61 |
| 3114139 | 11/1982 | Germany ................................ 235/383 |
| 3330301 | 3/1985 | Germany ................................ 235/383 |
| 5-314367 | 11/1993 | Japan ..................................... 235/383 |

OTHER PUBLICATIONS

Burger King Tests Credit–Card Payments, *The Miami Herald Knight–Ridder/Tribune Business News* Jul. 9, 1993.

U–Scan Express™, The U–Scan Express™ Self–Checkout System, Spectra–Physics Scanning Systems, Inc., Feb. 1996.

(List continued on next page.)

*Primary Examiner*—F. J. Bartuska

[57] ABSTRACT

A self-service checkout apparatus for processing items selected by a customer for purchase includes a customer operated device, such as a scanner/scale, for identifying each item selected for purchase. The apparatus also includes a self-service terminal which includes a card or cash payment accepting device, a cash dispensing device for providing a customer with cash by way of change or cashback, and an electronic controller connected to the customer operated device and arranged to determine the price of each item identified by the customer operated device. The terminal displays the total amount payable on a screen. A customer exit is normally closed by a security gate which is arranged to be opened in response to the customer making payment for the total amount. The terminal can be used to provide ATM services independently of a checkout transaction.

28 Claims, 17 Drawing Sheets

OTHER PUBLICATIONS

Optimal Robotics 8870 System™, Optimal Robotics Corporation, 1995.

Robots Will Do Checkout at Grocery, *Houston Post* (Final, Business, p. C1), Feb. 22, 1995, by Jeanne Lang Jones.

Kroger Self–Scan Lane to Test Debit–Credit, *Supermarket News*, vol. 45, No. 14, p. 13+, Apr. 3, 1995, by Denise Zimmerman.

Kroger Unit to Expand Customer Self–Scanning, *Supermarket News*, Aug. 14, 1995, p. 15, by Denise Zimmerman.

Dinaj Wisemberg Brin, "You–Buy, you scan bag", *Dayton Daily News*, Sunday, Aug. 11, 1996, Section 9E.

FIG. 10

PLEASE PRESS KEY TO
SELECT FRUIT

BANANAS         APPLES    40C

ORANGES

GRAPES

PEARS

FIG. 11

YOU HAVE SELECTED APPLES PLEASE
PRESS KEY TO SELECT TYPE OF APPLE

MACINTOSH REDS

GOLDEN DELICIOUS    40D

GRANNY SMITHS

= 5,992,570 =

SELF-SERVICE CHECKOUT APPARATUS

This is a continuation of application(s) Ser. No. 08/658,420 filed on Jun. 5, 1996 now abandoned.

BACKGROUND OF THE INVENTION

This invention relates to a checkout apparatus for use in supermarkets or other retail establishments, such apparatus serving to process items selected by a customer for purchase and enabling the customer to check out and pay for such items.

In the supermarket industry, after the cost of the goods sold, labor is the fastest growing major expense. Reducing or eliminating the amount of time taken for a cashier to handle and scan the goods purchased by a customer can substantially reduce the labor required in a retail establishment and thereby alleviate a currently growing problem. Another problem experienced by supermarket management is the risk of repetitive motion disorders or injuries to cashiers brought about by the lifting and moving of hundreds of kilograms of goods every day. Thus, there are clearly potential advantages to be gained by using self-service procedures in the checking out process in retail establishments, particularly supermarkets.

From U.S. Pat. No. 4,676,343, there is known a self-service checkout system in which checkout counters are arranged in groups of two or more, with a single cashier station being provided for each group. Each counter is provided with a customer-operated laser scanner for enabling a customer to scan universal product code (UPC) labels carried by items selected by the customer for purchase. After scanning, the items are carried by a conveyor to a bagging area. When scanning is completed, a receipt unit at the counter delivers to the customer a printed recall number which is taken together with the subsequently bagged items to the cashier for payment and issuance of a final receipt. Although this system reduces labor costs to a significant extent, it is still necessary to provide a cashier for each group of typically five or six checkout counters. Also, the system has the disadvantage that there is a tendency for a queue to build up at each cashier station.

Another known system involves providing specially designed carts each carrying a portable data terminal. Each data terminal has RF capability for communicating with a remote data processing unit, and has an integrated laser scanner which allows a customer to scan items as they are removed from supermarket shelves prior to placing the items in the cart. In this way, a running total of the cost of the selected items is maintained, and customers can proceed to a cashier station when they have finished shopping merely to pay for their goods. This system has the disadvantage of having to provide a data terminal for each cart. Also, again this system requires that customers pay for their goods at a cashier station.

SUMMARY OF THE INVENTION

In accordance with one aspect of the present invention, there is provided a checkout apparatus for processing items selected by a customer for purchase. The apparatus includes customer operated means for identifying each item selected for purchase. The apparatus further includes self-service terminal means which includes payment accepting means for enabling the customer to make payment for the purchased items, cash dispensing means arranged to provide the customer with cash by way of change or otherwise, and electronic control means which is connected to the customer operated means and which is arranged to determine the price of each item identified by the customer operated means. The self-service terminal means is arranged to provide to the customer an indication of the total amount to be paid by the customer for the purchased items.

Thus, it is an object of the present invention to provide a checkout system for use in a retail establishment which utilizes improved self-service procedures compared with the aforementioned known systems.

It is another object of the present invention to provide a checkout system which includes a single computing device which combines the functionality of an automated teller machine and a point-of-sale terminal.

It is another object of the present invention to provide a checkout system which guides a customer through a transaction to minimize customer confusion and to hasten the checkout process.

It is another object of the present invention to provide a checkout system which allows customers to purchase non-UPC products (no bar code).

BRIEF DESCRIPTION OF THE DRAWINGS

One embodiment of the invention will now be described by way of example with reference to the accompanying drawings, in which:

FIGS. 8–12 are typical displays which appear on the screen of an automated teller machine (ATM) included in the apparatus of FIGS. 1 and 2 when a produce item is being weighed in accordance with the program in the flowchart of FIG. 7;

DETAILED DESCRIPTION

Figure 1:
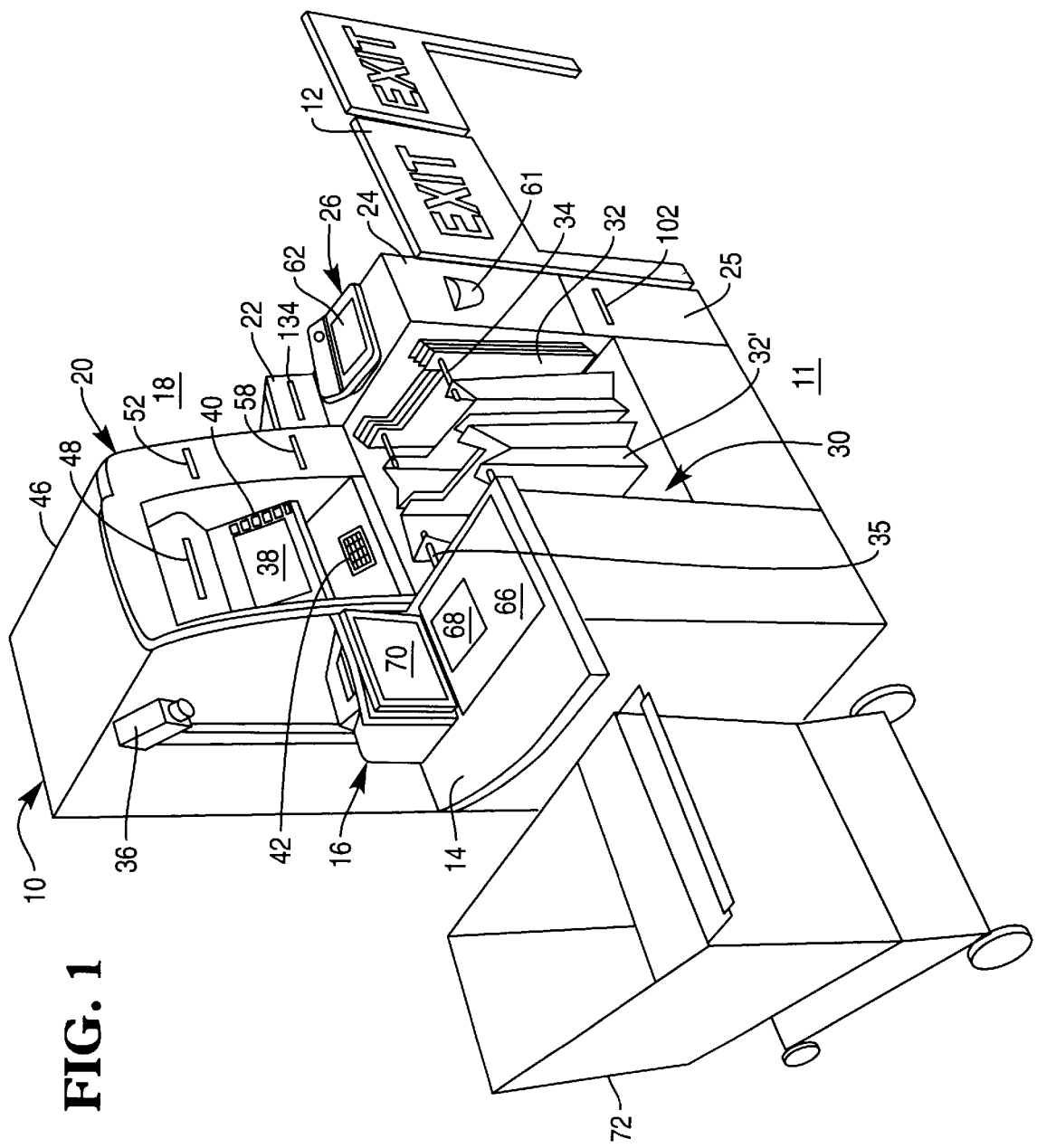
FIG. 1 is a perspective view of a self-service checkout apparatus constructed in accordance with the invention.
Figure 2:
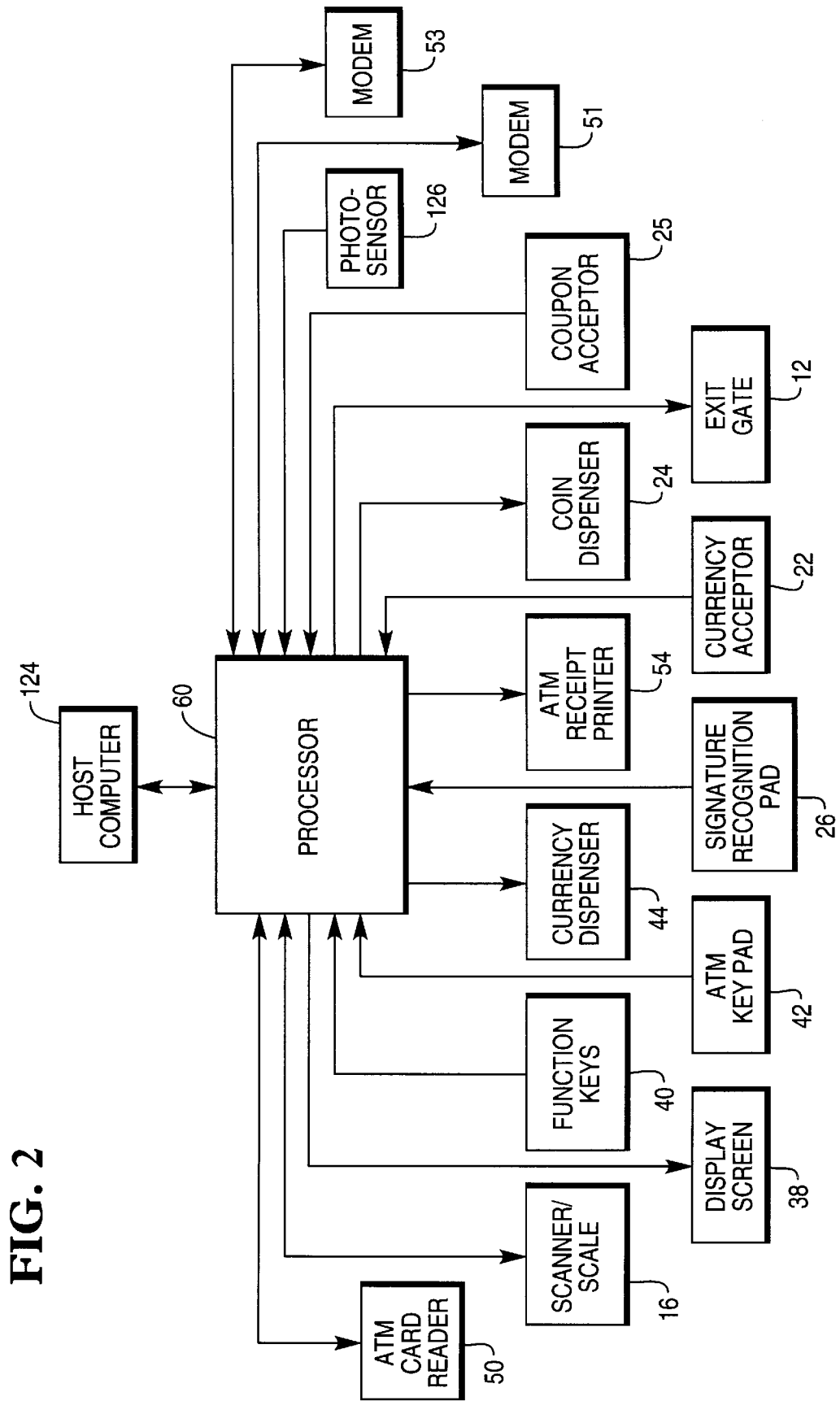
FIG. 2 is a block diagram showing the electrical interconnections of components of the apparatus of FIG. 1.

Referring to FIGS. 1 and 2 of the drawings, there is shown therein a self-service checkout apparatus 10 in a supermarket. The apparatus 10 includes a security gate 12 located at an exit end of a customer passageway 11. Located on one side of the passageway 11 are a counter 14, a laser scanner/scale 16, and a self-service financial terminal 18 comprising an automated teller machine (ATM) 20 together with a currency acceptor module 22 having an input slot 134, a coin dispenser module 24 having a coin receptacle 61, and a coupon acceptor module 25 having a coupon slot 102. Also associated with the ATM 20 is a signature recognition pad 26 mounted on the coin dispenser module 24.

Preferably, self-service financial terminal 18 is an NCR multi-function ATM that has been modified to include hardware components found in a point-of-sale environment and software that integrates ATM functionality with point-of-sale transaction functionality. It should be noted that the ATM 20 can be used to provide conventional ATM services independently of any checkout transaction.

A recess 30 between the counter 14 and the coin dispenser module 24 accommodates a supply of plastic bags 32 suspended from a first pair of rails 34, and a further plastic bag 32' suspended from a second pair of rails 35. As will be described later, a customer loads purchased items of merchandise into the bag 32' in the course of a merchandise purchasing transaction. A surveillance video camera 36 linked to a remote monitoring station (not shown) is mounted above the scanner/scale 16, whereby a supervisor at a remote monitoring station can view the scanner/scale 16 and the bag 32' suspended from the rails 35 and thereby survey a complete checkout transaction carried out at the checkout apparatus 10.

In known manner, the ATM 20 includes a display screen 38, function keys 40 located on either side of the screen 38, a key pad 42 located beneath the screen 38, a currency dispenser module 44 which is mounted in a secure area inside the cabinet 46 of the ATM 20 and which is associated with a cash dispenser slot 48 in the cabinet 46, a card reader 50 arranged to read data from a card (such as a customer identification card, a debit card, a credit card, or a SMART card) inserted in the ATM 20 via a card slot 52, and print means 54 arranged to print paper items such as receipts, vouchers etc. and to supply such items to a customer via a receipt slot 58. A first modem 51 allows ATM 20 to maintain communication with host computer 124. A second modem 53 allows ATM 20 to process credit card payment authorization requests. Alternatively, a single modem and phone connection may be employed for both purposes.

Currency dispenser module 44 is manufactured by NCR. Card reader 50 is manufactured by NCR. Print means 54 is manufactured by NCR. Modems 51 and 53 are standard PC industry modules manufactured by a variety of vendors.

The ATM 20 also includes an electronic control means in the form a PC processor unit 60 to which are coupled the scanner/scale 16, the signature pad 26, the function keys 40, the key pad 42, the card reader 50, the currency acceptor module 22 and the coupon acceptor module 25, and which controls the operation of the display screen 38, the currency dispenser module 44, the coin dispenser module 24, the exit gate 12 and the print means 54. PC processor unit 60 is a PC-compatible processor.

The display screen 38 provides a continuous display which serves to guide a customer through a merchandise purchasing transaction, the display providing instructions to the customer at various stages of the transaction. For example, an instruction may involve the display instructing the customer to operate a selected one of the function keys 40, or to enter numerical data via the key pad 42. Thus, the customer may enter a Personal Identification Number (PIN) or a Product Look-Up (PLU) code via the key pad 42. As is well known, when the currency dispenser module 44 is instructed by the processor unit 60 to dispense cash, one or more currency notes are picked from one or more of a plurality of currency cassettes (not shown) included in the currency dispenser module 44 and are presented to a customer in the form of a stack through the currency dispenser slot 48. If in the course of a customer transaction coins are to be presented to the customer in addition to, or instead of, notes, then the processor unit 60 will instruct the coin dispenser module 24 to dispense the appropriate amount in coins for collection by the customer from the coin receptacle 61.

The signature recognition pad 26 may be a Model 5991 signature recognition pad marketed by NCR Corporation of Dayton, Ohio, U.S.A. As is known, the signature recognition pad 26 includes a pressure transducer plate 62 on which a customer "writes" his or her signature using a stylus (not shown). The pad 26 forms a digitized image of the signature and this image is transmitted to the processor unit 60 of the ATM 20 for storage therein.

Most items in a supermarket, other than fruit and vegetable produce or delicatessen items, carry a bar code, i.e. the universal product code (UPC), which identifies the item. The scanner/scale 16 is used to read UPC bar codes, and is also used to weigh items which do not carry a bar code. In the present embodiment of the self-service checkout apparatus 10, the scanner/scale 16 is an NCR 7870 scanner/scale marketed by NCR Corporation. The scanner/scale 16 has a weighing scale plate 66 which is flush-mounted relative to the upper surface of the counter 14. A scanning window 68 is provided in the scale plate 66, and the scanner/scale 16 is also provided with an upstanding scanning window 70. Thus, the scanner/scale 16 has the ability to read bar codes on any one of four sides of a package.

In addition, the scanner/scale can read bar codes on items moved from left-to-right or right-to-left over the window 68 or simply placed on the window 68. It will be appreciated, therefore, that the scanner/scale 16 is very easy to operate, and can be successfully used by members of the public without prior training. The scanner/scale 16 generates an audible tone when a successful scan has been completed, and a signal identifying the scanned item is sent by the scanner/scale 16 to the processor unit 60 of the ATM 20. Upon receiving this signal, the ATM 20 will display on the display screen 38 wording identifying the scanned item together with an indication of its price.

If merchandise is to be purchased which does not carry a bar code and which requires to be weighed, such as fruit and vegetable produce, then the merchandise is placed on the scale plate 66 (usually in a plastic bag) and the merchandise is identified using the function keys 40, as will be explained in more detail later. A signal indicative of the weight of the merchandise is sent by the scanner/scale 16 to the processor unit 60, and upon receipt of this signal the ATM 20 will display on the display screen 38 wording identifying the weighed merchandise together with an indication of its price.

In the apparatus of the present invention, the hardware and software of an automated teller machine are integrated with the hardware and software of a point-of-sale terminal. Thus, the hardware elements of FIG. 2 may be integrated together into a single computer cabinet. Peripherals 16, 22, 24, 25, 26, 40, 42, 44, 50, and 54 preferably connect to a serial controller in a well-known manner, such as an RS 232 or universal serial bus (USB) controller. Display screen 38 preferably connects to a video controller in a well-known manner. Photosensor 126 and exit gate 12 couple to exit gate control circuitry in a well-known manner. The above controllers may reside on adapter cards or on a motherboard that supports processor unit 60.

The software architecture is preferably designed to work with the Microsoft Windows NT operating system, however, other suitable operating systems are envisioned. Thus, the software architecture includes a self-service checkout application and hardware drivers that allow the operating system to communicate with the peripherals of FIG. 2.

The self-service checkout application includes the combined software functions of a point-of-sale terminal and an automated teller machine. The self-service checkout application includes software objects for the elements of FIG. 2 that are easily created using well-known object-oriented programming techniques. These software objects allow the self-service checkout application to control the peripherals through the operating system, and their operation in completing a transaction is described in the flow diagrams of FIGS. 5–7, 14–15, and 17–19.

For security reasons, the described embodiment of the present invention is intended for use by customers who have been provided with a customer identifying card (shopping card) by the supermarket. However, it should be understood that the use of a customer identification card is not an essential requirement of the present invention, and other security measures could be employed as will be indicated later.

When using the self-service checkout apparatus 10 described herein, a customer will approach the counter 14 with merchandise to be purchased held in a conventional shopping trolley or cart 72. At this stage, the display screen 38 of the ATM 20 will be displaying a standard initial message. It should be understood that during the opening hours of the supermarket, the surveillance camera 36 is permanently operated, so that the arrival of the customer and the cart 72 holding the merchandise to be purchased can be seen by the supervisor at the remote monitoring station.

Figure 3:
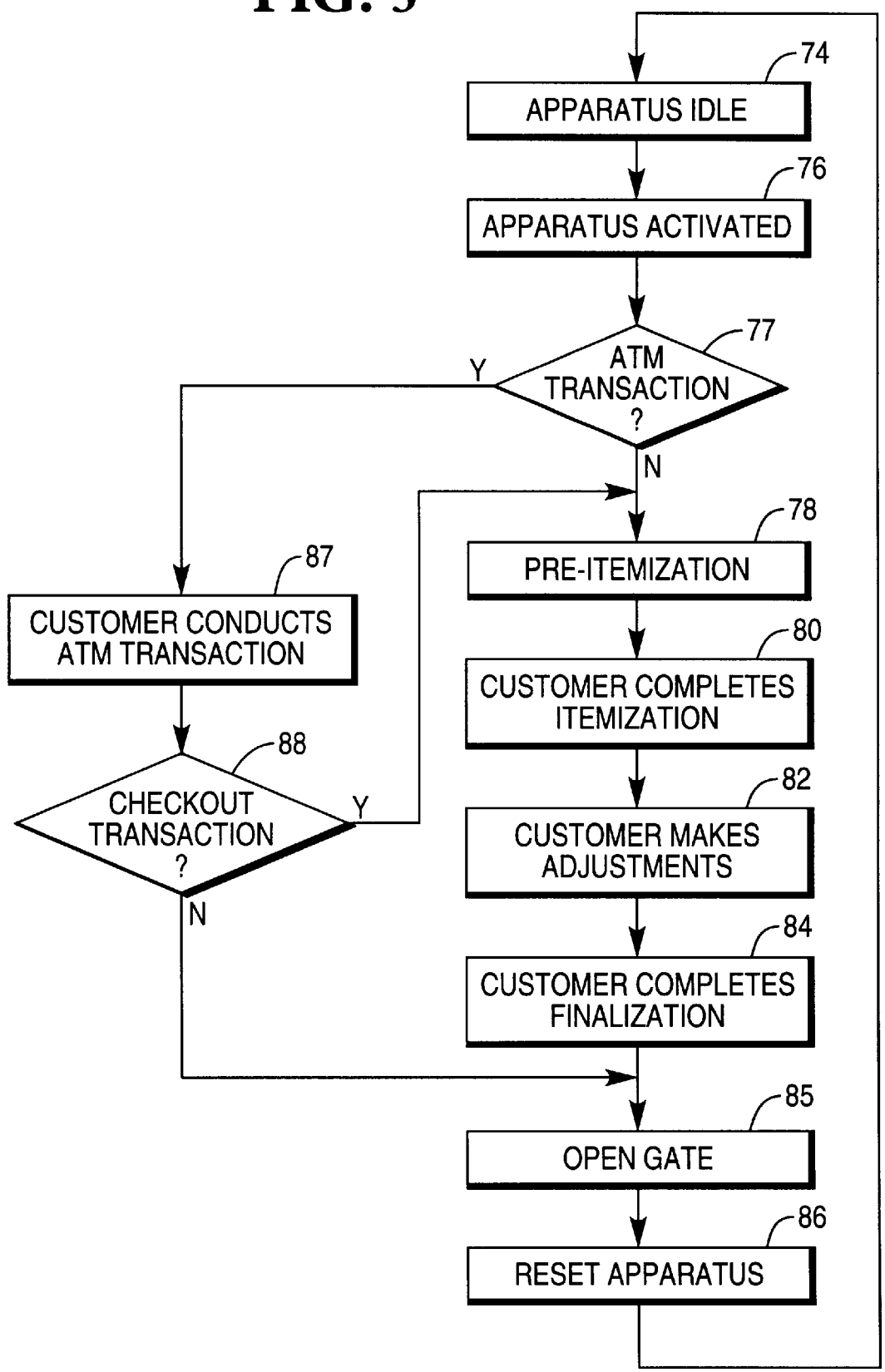
FIG. 3 is a high level flowchart used in describing a complete customer transaction.

Referring now to FIG. 3, when the customer arrives at the checkout apparatus 10, the apparatus is in an idle condition (block 74). As instructed by the initial message on the display screen 38, the customer initiates an ATM or checkout transaction by depressing the designated function key 40. This causes the apparatus to become fully activated (block 76), with the scale reading of the scanner/scale 16 being set to zero. Next, the display on the screen 38 changes so as to request the customer to indicate whether he or she wishes to carry out an ATM transaction by depressing an appropriate one of the function keys 40 (block 77). If the customer does not select an ATM transaction, then the process flow proceeds to a pre-itemization stage (block 78) in which first the display on the screen 38 instructs the customer to identify himself or herself by inserting his or her shopping card into the card slot 52, this card being returned to the customer immediately after the information on the card has been read by the card reader 50.

Next in the pre-itemization stage (block 78), the display on the screen 38 instructs the customer to suspend a bag 32' from the rails 35 (this bag being obtained from the supply of bags 32 suspended from the rails 34), and to initiate a checkout transaction by depressing a designated one of the function keys 40. As will be described in more detail later, the customer then carries out the itemization procedure (block 80) in which using the scanner/scale 16 the customer scans or weighs the individual items of merchandise taken from the shopping cart 72. After the itemization procedure has been completed, the displays on the screen 38 instructs the customer how to proceed through an adjustment procedure (block 82) and a finalization procedure (block 84) after which the security gate 12 is opened (block 85) and the apparatus 10 is reset (block 86) so as to return it to its initial idle condition (block 74).

If the customer in block 77 selects an ATM transaction, then in known manner the screen 38 will display a series of messages guiding the customer through a conventional ATM transaction (block 87) which will involve the customer requesting one or more services such as withdrawal of cash, or the provision of a statement of account or balance of account, etc. In known manner, at the commencement of the ATM transaction, the customer is requested to insert his or her ATM card (customer identifying card) into the card slot 52 and to enter his or her PIN using the key pad 42. The ATM card is returned to the customer prior to the completion of the ATM transaction. If a cash withdrawal service is requested, then the requested amount of cash in the form of one or more currency notes is presented to the customer through the dispenser slot 48, and a cash withdrawal statement, printed by the print means 54, is presented to the customer through the receipt slot 58.

After the ATM transaction (block 87) is completed, the display on the screen 38 requests the customer to indicate whether he or she now wishes to carry out a checkout transaction by depressing an appropriate one of the function keys 40 (block 88). If the customer does wish to carry out a checkout transaction, then the process flow proceeds to the pre-itemization stage represented by the block 78. If the customer does not wish to carry out a checkout transaction, then the security gate 12 is opened (block 85) so as to permit the customer to pass through the gate 12 away from the checkout apparatus 10, and the apparatus is reset (block 86) and returned to its idle condition (block 74).

The itemization procedure of block 80 of FIG. 3 will now be described in more detail with particular reference to FIG. 4. When the pre-itemization stage (block 78 of FIG. 3) is completed, messages are displayed on the screen 38 by way of instructions to the customer for carrying out the itemization procedure of FIG. 4. The customer is provided with instructions via the screen 38 to remove each item of merchandise in turn from the shopping cart 72.

In the case of an item carrying a bar code (block 200 of FIG. 4), the item is scanned (block 202) by passing it over the window 68 in the scale plate 66. More specifically, the customer is instructed to pass the item over the window 68 with the bar code facing downwardly, or rearwardly or to either side. If the scan is successful, an audible tone is generated by the scanner/scale 16 and the price and identity (name, brand, weight, etc.) of the scanned item are displayed on the screen 38 and printed by the print means 54 on a receipt which is presented to the customer through the receipt slot 58 at the completion of the purchasing transaction. The display on the screen 38 instructs the customer to place the successfully scanned item in the bag 32' (block 214).

Figure 5:
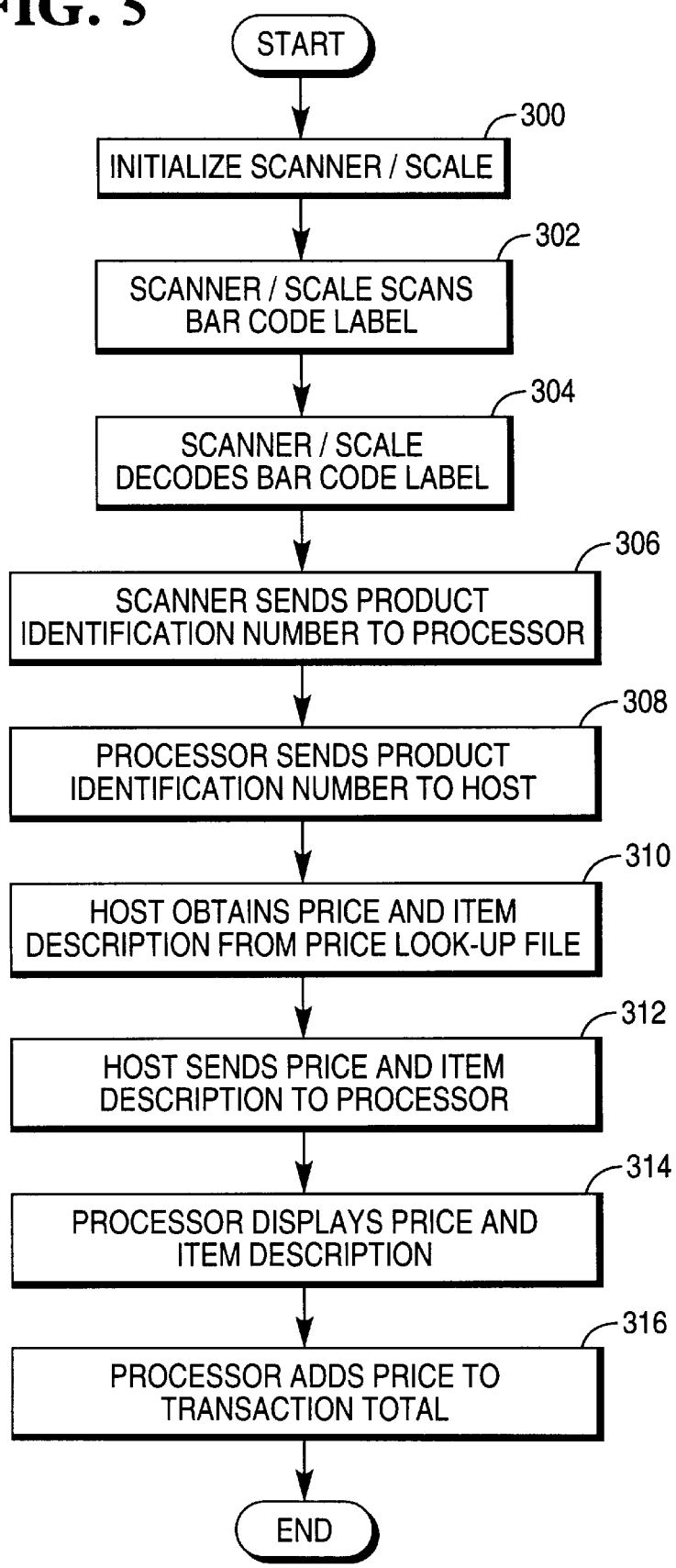
FIG. 5 is a flowchart of a program which is executed by the apparatus when an individual item of merchandise is scanned.

As the item is being scanned, the apparatus 10 operates in accordance with a program which is depicted in the flowchart of FIG. 5. As shown in step 300 of FIG. 5, the scanner/scale 16 is initialized before the bar code label is scanned in step 302. The scanner/scale 16 then decodes the bar code label to provide a product identification number associated with the item as shown in step 304 before sending this information to the processor unit 60 as shown in step 306. The processor unit 60 in turn sends this information to the host computer 124 as shown in step 308.

The host computer 124 uses the product identification number associated with the item to obtain a description of the item and a price of the item from a price look-up file stored in memory at the host computer 124 as shown in step 310. The host computer 124 then sends this information to the processor unit 60 as shown in step 312. The description of the item and the price of the item are displayed on the display screen 38 as shown in step 314. The price of the item is then added to the transaction total which is stored in memory at the processor unit 60.

If the scan (blocks 200 and 202 in FIG. 4) is not successful, the customer is instructed to ascertain and enter the PLU code for the item (blocks 204 and 206). Instead of scanning an item (for example if the item is of an awkward shape), the customer may proceed directly to the PLU code procedure (block 206) for entering the PLU code. In the PLU code procedure, the customer is instructed by the display on the screen 38 to read the PLU code from a label on the item in question, and to enter the PLU code by means of the key pad 42. The ATM 20 confirms that the PLU code has been correctly entered by displaying the identity and price of the item on the screen 38, this information being printed on the receipt as in the case of a scanned item. After the PLU code has been correctly entered, the customer places the item in the bag 32' (block 214).

Figure 6:
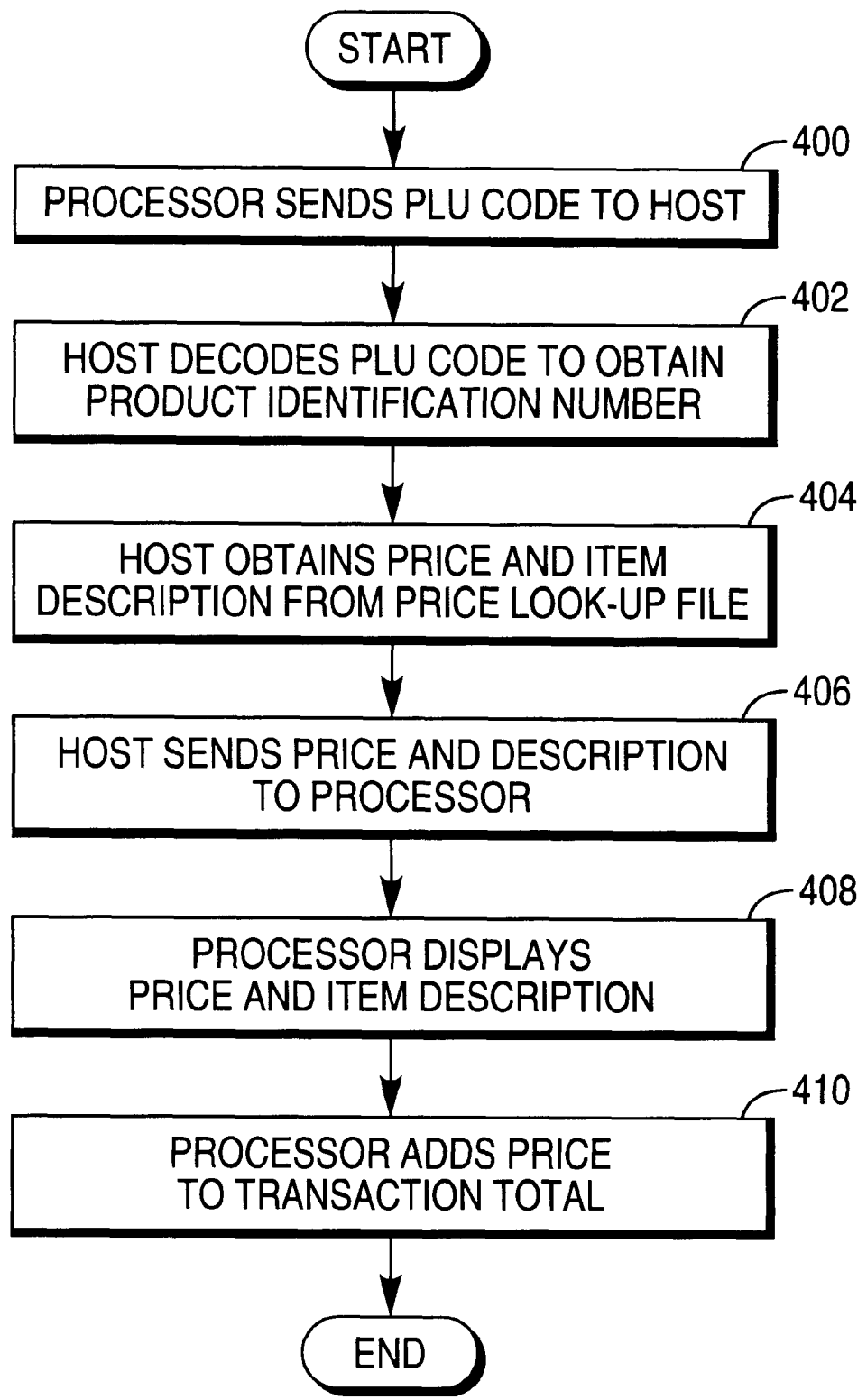
FIG. 6 is a flowchart of a program which is executed by the apparatus when a customer enters a PLU code.

When the PLU code is entered for the item, the apparatus 10 operates in accordance with a program which is depicted in the flowchart of FIG. 6. As shown in step 400 of FIG. 6, the processor unit 60 sends the entered PLU code to the host computer 124. The host computer 124 decodes the PLU code as shown in step 402 to obtain a product identification number for the item. The host computer 124 uses the product identification number associated with the item to obtain a description of the item and a price of the item from a price look-up file stored in memory at the host computer 124 as shown in step 404. The host computer 124 then sends this information to the processor unit 60 as shown in step 406. The description of the item and the price of the item are displayed on the display screen 38 as shown in step 408. The price of the item is then added to the transaction total which is stored in memory at the processor unit 60 as shown in step 410.

In the case of an item which does not carry a bar code (such as a delicatessen item or an item of fruit or vegetable produce) or which has been unsuccessfully scanned or is inconvenient to scan, the customer is instructed to place the item on the scale plate 66 if it is to be weighed (blocks 208 and 210 of FIG. 4) or to enter a PLU code for the item (blocks 204 and 206).

Figure 4:
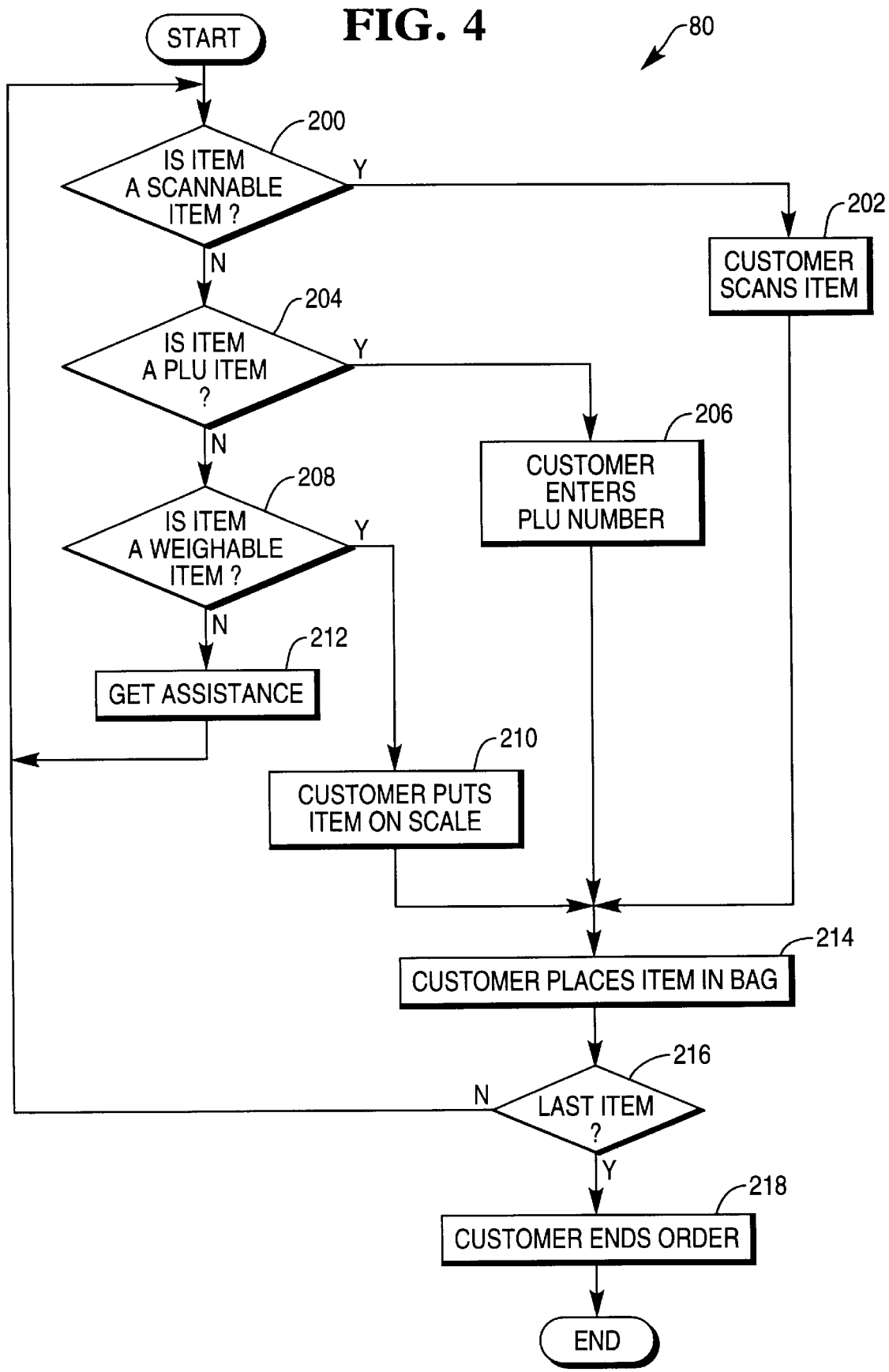
FIG. 4 is a flowchart used in describing the itemization procedure of a checkout transaction where a customer scans an individual item of merchandise, enters the product look-up (PLU) code in respect thereof, or weighs a produce item.

When the item is to be weighed, the customer places the item on the scale plate 66 and enters the identity of the item using the function keys 40 (blocks 208 and 210 of FIG. 4). The act of placing the item on the scale plate 66 causes an appropriate menu to be displayed automatically on the screen 38. Typical menus displayed on the screen 38 are shown in FIGS. 8–12. By selecting appropriate displayed options using the function keys 40, the item of merchandise on the scale plate 66 is identified by the customer.

Figure 8:
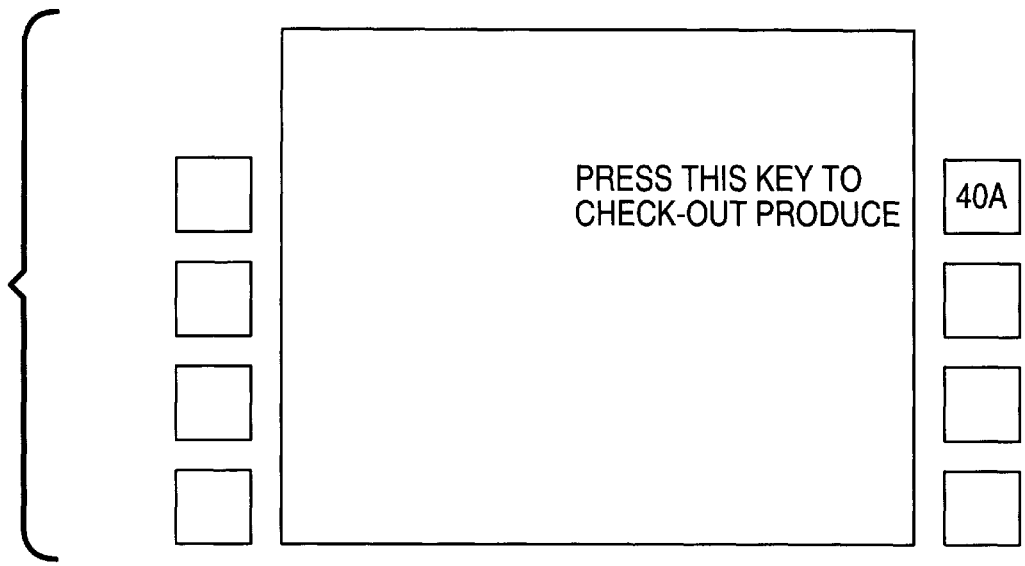
Figure 9:
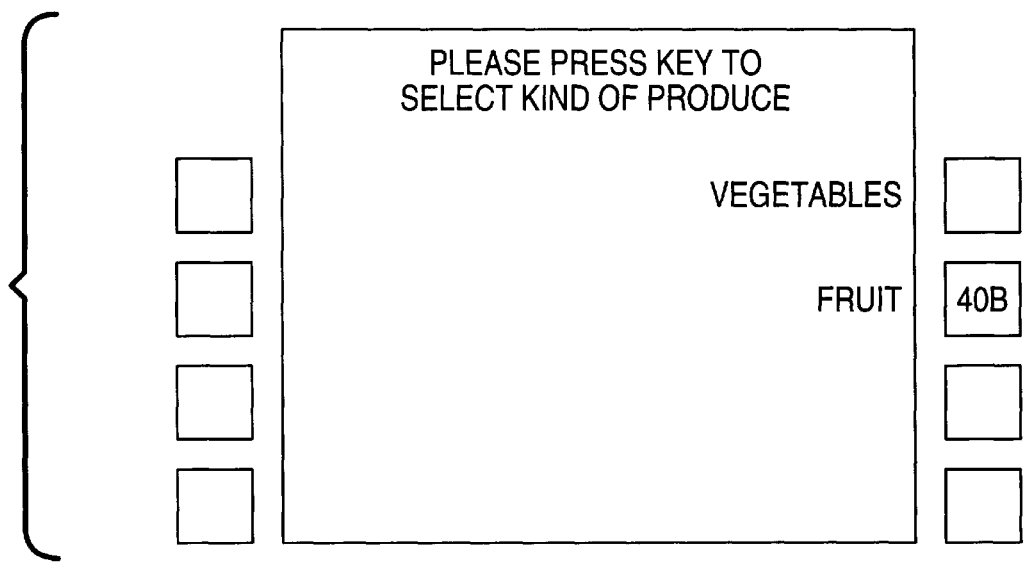
Figure 12:
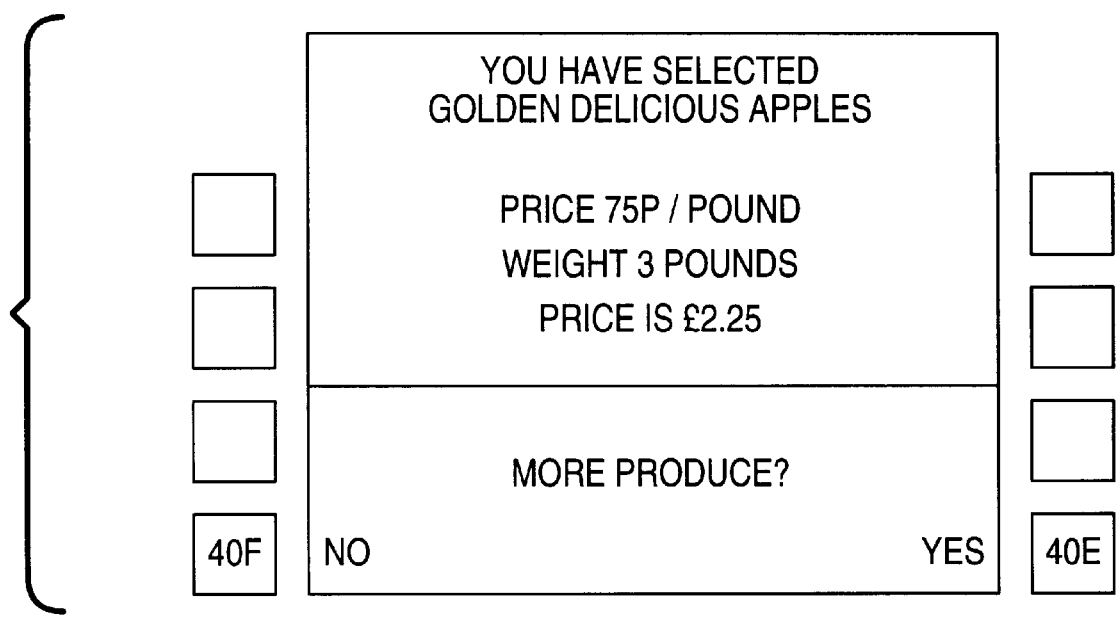

For example, "Golden Delicious" apples are identified by activating the function key 40A in FIG. 8, the function key 40B in FIG. 9, the function key 40C in FIG. 10, and the function key 40D in FIG. 11. The scanner/scale 16 transmits a signal indicative of the weight of the item to the processor unit 60 of the ATM 20, and thus when the customer has identified the item the processor unit 60 causes the identity and price of the item to be displayed on the screen 38 and to be printed on the receipt. When the successful entry of a weighed item has been confirmed by virtue of the identity and price of the item being displayed on the screen 38 as shown in FIG. 12, the item is placed in the bag 32' (block 214 of FIG. 4). The customer then depresses either the function key 40E or the function key 40F, depending on whether or not he or she wishes to check out a further item of produce.

Figure 7:
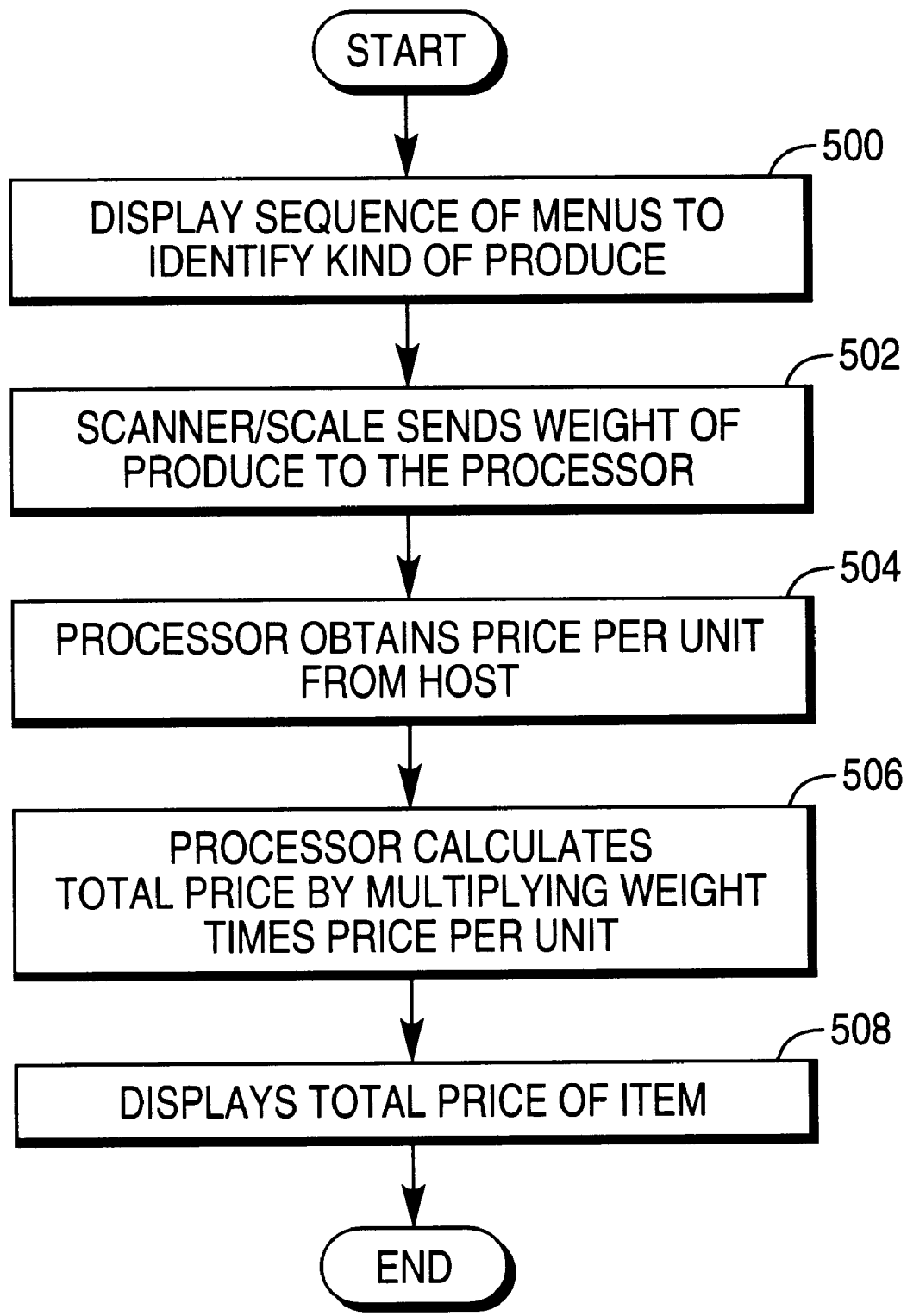
FIG. 7 is a flowchart of a program which is executed by the apparatus when a produce item is being weighed.

As the item is being weighed, the apparatus 10 operates in accordance with a program which is depicted in the flowchart of FIG. 7. As shown in step 500 of FIG. 7, the sequence of menus (FIGS. 8–12 for example) is displayed to allow the customer to identify the type of produce which is being purchased. After the type of produce is identified, the scanner/scale 16 establishes the weight of the produce and sends this weight information to the processor unit 60 as shown in FIG. 502. In step 504, the processor unit 60 obtains a price per unit of the identified type of produce from the host computer 124. The processor unit 60 uses the actual weight of the produce and the price per unit of the produce to calculate a total price by multiplying the weight and the price per unit as shown in step 506. The total price of the produce is then displayed on the display screen 38 as shown in step 508.

After a item has been placed in the bag 32', the customer removes the next item from the cart 72 and repeats the itemization procedure of scanning the item (blocks 200 and 202 of FIG. 4), ascertaining and entering the PLU code for the item (blocks 204 and 206), or weighing and identifying the item (blocks 208 and 210) before again placing the item in the bag 32' (block 214). The itemization process just described is continued until the last item (block 216 of FIG. 4) has been placed in the bag 32' whereupon the customer indicates that the processing of the purchased items has been completed by operating an appropriate one of the function keys 40, at which time the total amount payable by the customer is displayed on the screen 38.

If, in the course of a lengthy checkout transaction, the bag 32' becomes full or substantially full, the bag 32' can be removed from the rails 35, placed in the cart 72, and replaced by an empty bag obtained from the rails 34, prior to continuing with the itemization procedure.

Figure 13:
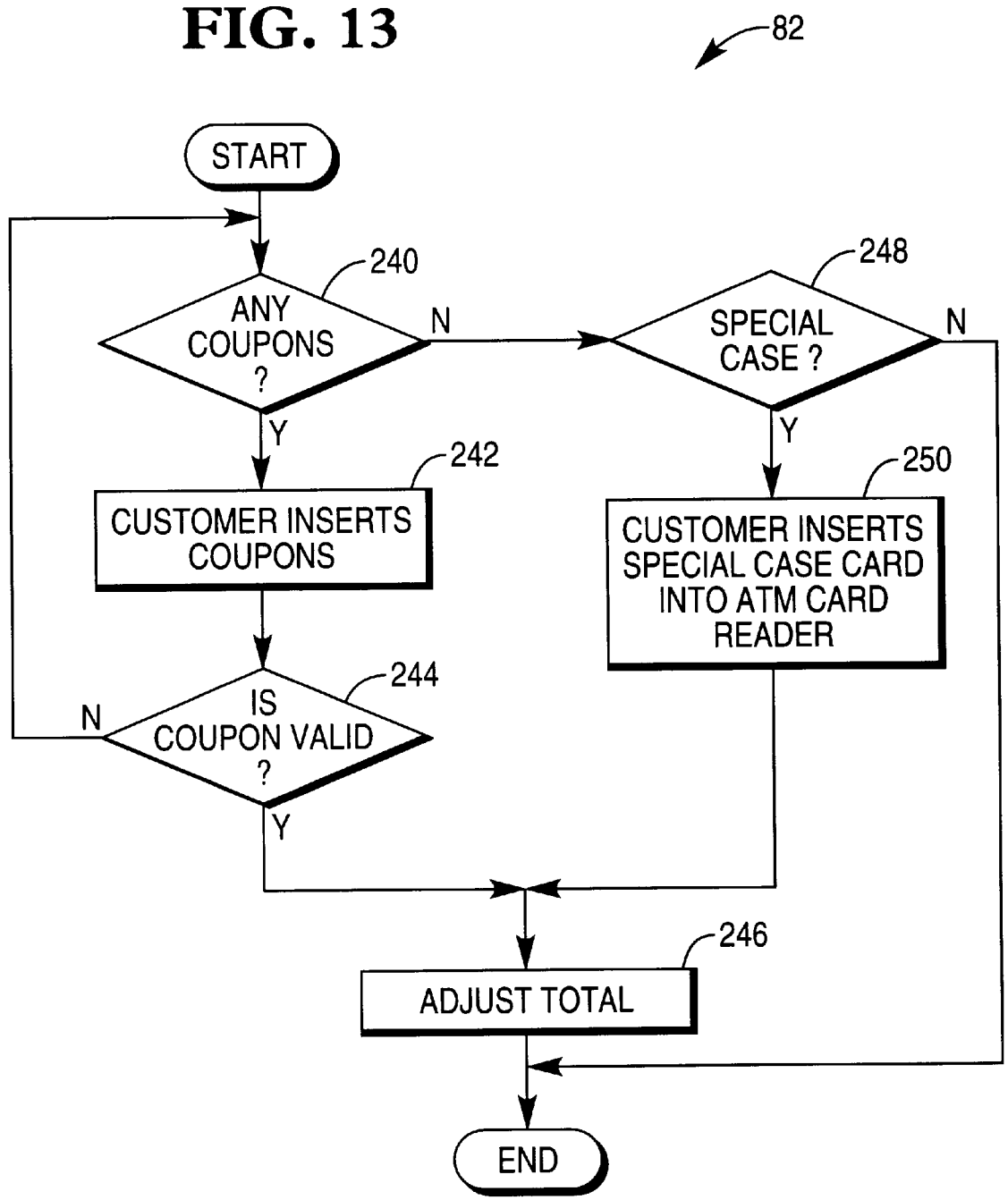
FIG. 13 is a flowchart used in describing the adjustment procedure that may be made in a checkout transaction subsequent to the completion of the itemization procedure of FIG. 4.

Referring now back to FIG. 3, after the customer has indicated that the itemization procedure (block 80) has been completed, a message appears on the screen 38 inquiring as to whether the customer has any adjustments (block 82) to make, such as discount vouchers of predetermined type which he or she wishes to use. By actuating an appropriate one of the function keys 40, the customer indicates whether there are one or more such coupons to be used as shown in block 240 of FIG. 13. If there are, then the customer inserts (block 242) the each coupon into the coupon slot 102 of the coupon acceptor 25. A determination (block 244) is made by the coupon acceptor 25 in a known way as to whether the coupon inserted by the customer is valid.

Figure 14:
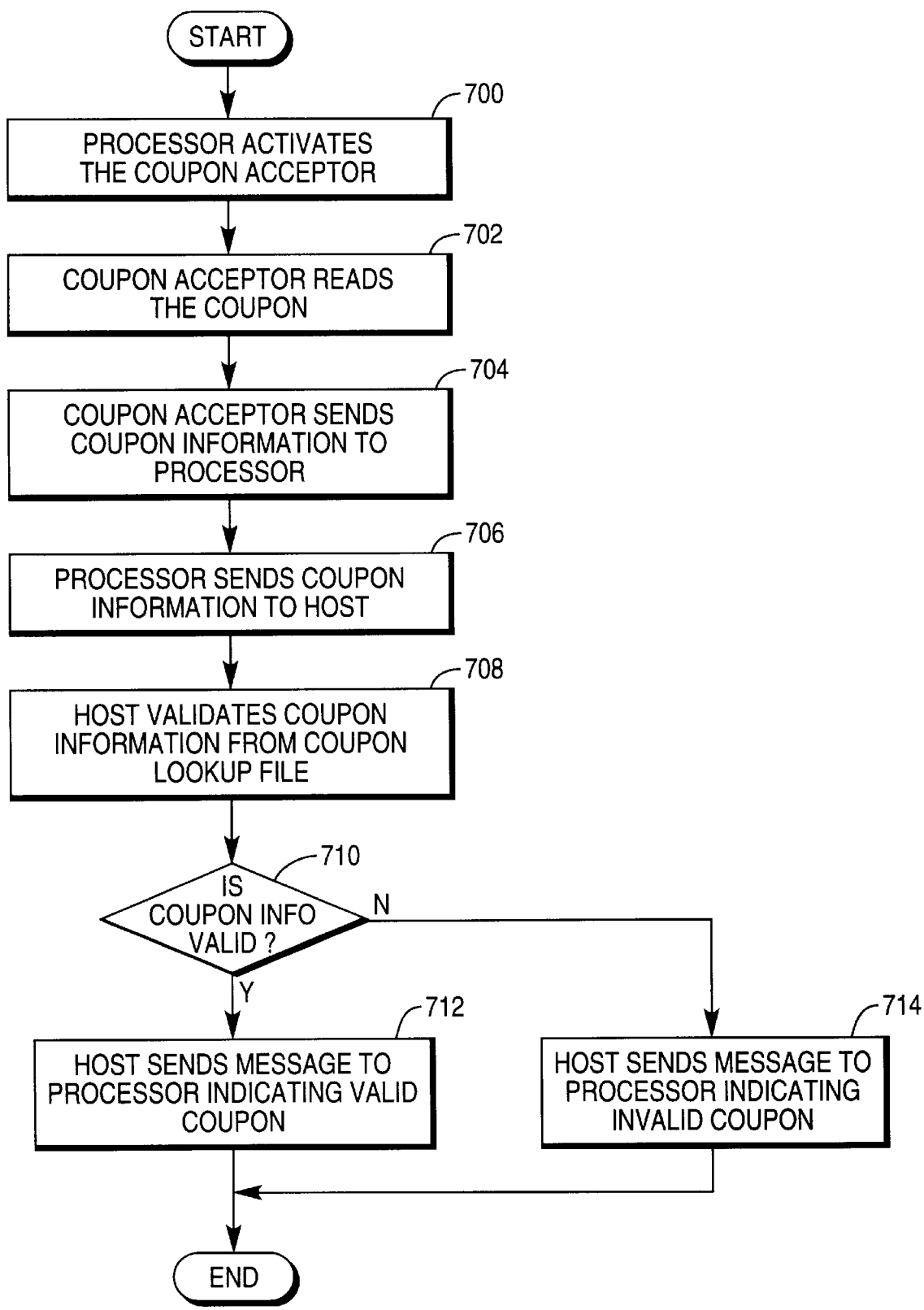
FIG. 14 is a flowchart of a program which is executed by the apparatus when a customer uses a coupon in the adjustment procedure of FIG. 13.

As the customer inserts a coupon into the coupon acceptor 25, the apparatus 10 operates in accordance with a program which is depicted in the flowchart of FIG. 14. As shown in step 700 of FIG. 14, the processor sends a signal to the coupon acceptor 25 to activate the coupon acceptor. When activated, the coupon acceptor 25 reads the inserted coupon as shown in step 702, and then sends information read from the coupon to the processor 704 as shown in step 704. The processor unit 60 in turn sends this coupon information to the host computer 124 as shown in step 706.

As shown in step 708 of FIG. 14, the host computer 124 validates the coupon information in a known manner by using data from a coupon look-up file which is stored in memory at the host computer 124. If the coupon information is determined to be valid in step 710, then the program proceeds to step 712 in which the host computer 124 sends a message back to the processor unit 60 indicating that the inserted coupon is valid. Otherwise, the program proceeds to step 714 in which the host computer 124 sends a message back to the processor unit 60 indicating that the inserted coupon is invalid.

After all coupons have been inserted in the coupon acceptor 25 and assuming that all of the inserted coupons are valid, the processor unit 60 adjusts the total price (block 246 of FIG. 13) of the purchased items and causes this adjustment to be entered on the receipt to be issued to the customer. If in the step represented by block 240 the customer indicates that there are no coupons to be used, then a message appears on the screen 38 inquiring as to whether the customer possesses a special case card (such as a card issued to employees of the supermarket).

If the customer does have a special case card (block 248 of FIG. 13), the customer inserts this card (block 250) into the card slot 52 of the ATM 20, the card reader 50 reads the information carried on a magnetic stripe of the special case card and the processor unit 60 makes the appropriate adjustment (block 246) to the total purchase price, after which the card is returned to the customer. It should be understood that a special case card may be the same card as the shopping card used by the customer in the pre-itemization step represented by block 78 in FIG. 3.

Figure 15:
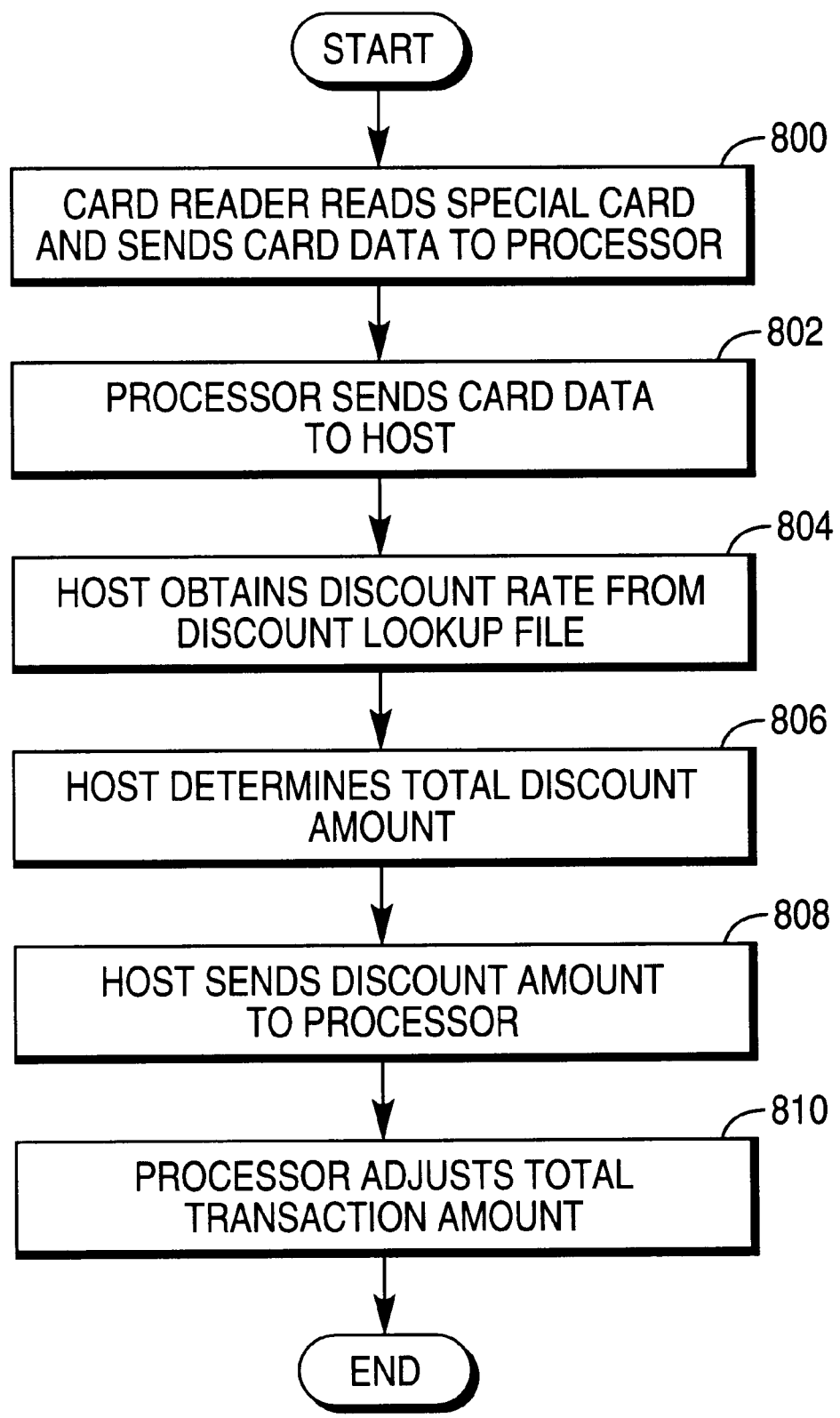
FIG. 15 is a flowchart of a program which is executed by the apparatus when a customer uses a special card in the adjustment procedure of FIG. 13.
Figure 16:
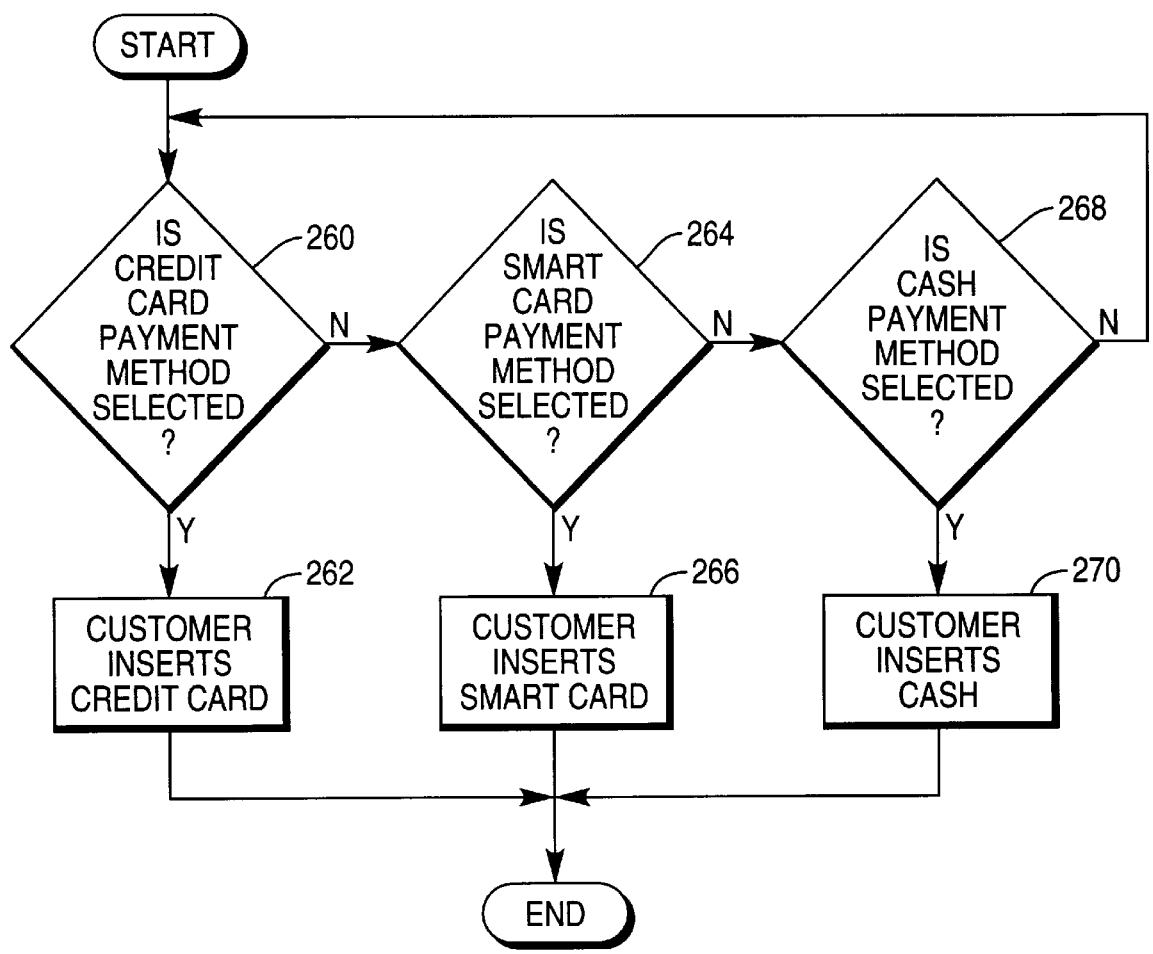
FIG. 16 is a flowchart used in describing the finalization procedure in a checkout transaction subsequent to the completion of the adjustment procedure of FIG. 13.

When a special case card is inserted into the card slot 52 of the ATM 20, the apparatus 10 operates in accordance with a program which is depicted in the flowchart of FIG. 15. As shown in step 800, the card reader 50 reads the special case card and sends this information to the processor unit 60. The processor unit 60 in turn sends this information to the host computer 124 as shown in step 802. The host computer 124 uses this information and obtains a discount rate from a discount look-up file stored in memory at the host computer 124 as shown in step 804. The host computer 124 uses the discount rate to calculate the total discount amount to be applied to the checkout transaction as shown in step 806, and sends this amount to the processor unit 60 as shown in step 808. The processor unit 60 then adjusts the total transaction amount of the checkout transaction with the applicable total discount amount as shown in step 810. After any such adjustment has been made or if customer does not have coupons or a special case card, the apparatus proceeds to the finalization procedure (block 84 of FIG. 3) as will now be described with reference to FIG. 16.

At the commencement of the finalization procedure, the total amount payable by the customer is displayed on the screen 38 and a message is displayed on the screen 38 inquiring as to whether the customer wishes to pay by card (magnetic stripe credit card or SMART card) or by cash. The customer makes this selection by actuating an appropriate one of the function keys 40.

If the customer elects to pay by a credit card (block 260 of FIG. 16), the customer is instructed by a message on the screen 38 to insert his or her credit card into the card slot 52 (block 262). The customer is then instructed by a message on the screen 38 to carry out a credit card authorization procedure by entering his or her signature using the signature pad 26. A digitized version of the customer's signature is stored in a memory section of the processor unit 60 for possible future reference in the event of a dispute occurring in respect of a particular checkout transaction.

Figure 17:
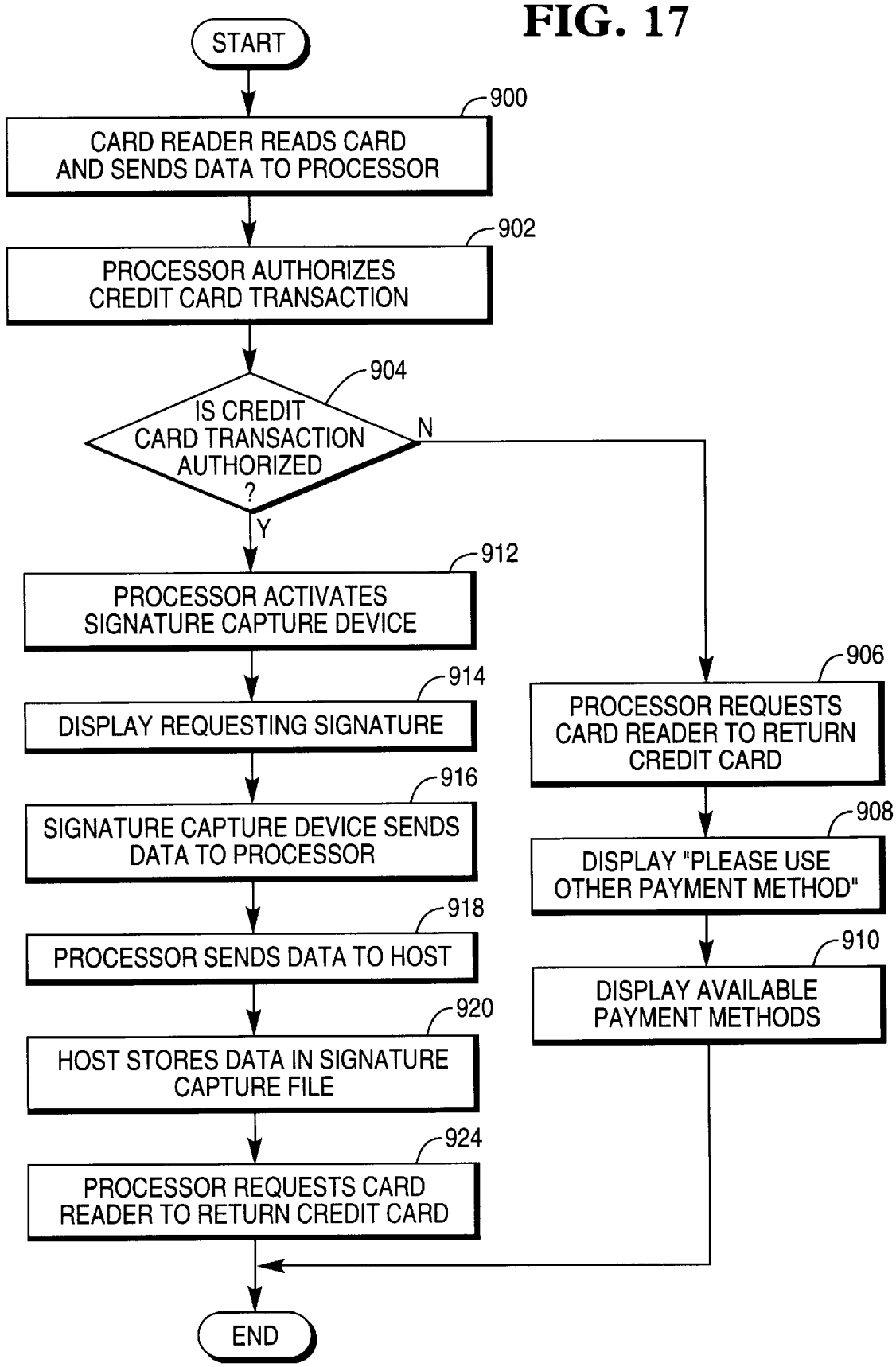
FIG. 17 is a flowchart of a program which is executed by the apparatus when the customer uses a credit card to make payment for the purchased items to complete the checkout transaction.

When the customer inserts the credit card into the card slot 52, the apparatus 10 operates in accordance with a program which is depicted in the flowchart of FIG. 17. As shown in step 904 of FIG. 17, the card reader 50 reads information from the credit card in response to insertion of the credit card into the card slot 52, and then sends this information to the processor unit 60. In step 902, the processor unit 60 takes the necessary steps to authorize the credit card transaction in a known manner. If the credit card transaction is not authorized, as determined in step 904, then the program proceeds to step 906 in which the processor unit 60 sends a message to the card reader 50 to instruct the card reader to return the credit card to the customer. The processor unit 60 then displays a message to the screen 38 indicating to the customer the that another payment method needs to be selected as shown in step 908. Also, the available payment methods are displayed on the screen 38 as indicated in step 910.

If the credit card transaction is authorized, as determined in step 904, then the program proceeds to step 912 in which the processor unit 60 sends a signal to the signature recognition pad 26 to activate the device. When the signature recognition pad 26 is activated, a message is displayed on the screen 38 requesting that the signature of the customer be provided. After capturing the signature of the customer, the signature recognition pad 26 sends this information to the processor unit 60 as shown in step 916 which, in turn, sends the information to the host computer 124 as shown in step 918. The host computer 124 then stores this signature in a transaction file containing the details of the transaction at the host computer 124 as shown in step 920, and the processor unit 60 sends a signal to the card reader 50 to return the credit card to the customer as shown in step 924.

A message then appears on the screen 38 inquiring if the customer requires cashback. By cashback is meant a facility provided by the supermarket to a customer paying by a debit or credit card which enables the customer to obtain cash up to a predetermined limit in the course of a checkout transaction. This facility has an advantage from the supermarket's point of view in that it reduces the amount of cash which has to be banked. The customer indicates whether or not cashback is required by actuating an appropriate one of the function keys 40.

If the customer does not require cashback, then the total amount payable by the customer is displayed on the screen 38, a receipt on which are printed details of all the purchased items and of any adjustments together with the final total payable is issued to the customer through the slot 58, and the processor unit 60 sends a signal to a host computer 124 (FIG. 2) indicative of the amount to be debited to the customer's account corresponding to the credit card used. If the customer indicates that he requires cashback, then the total amount payable is adjusted by the processor unit 60, to reflect the amount of cashback requested by the customer, prior to causing the total amount to be printed on the receipt. The processor unit 60 then causes the dispenser module 44 (and possibly also the coin dispenser 24) to dispense the requested amount of cash requested by the customer by way of cashback.

Figure 18:
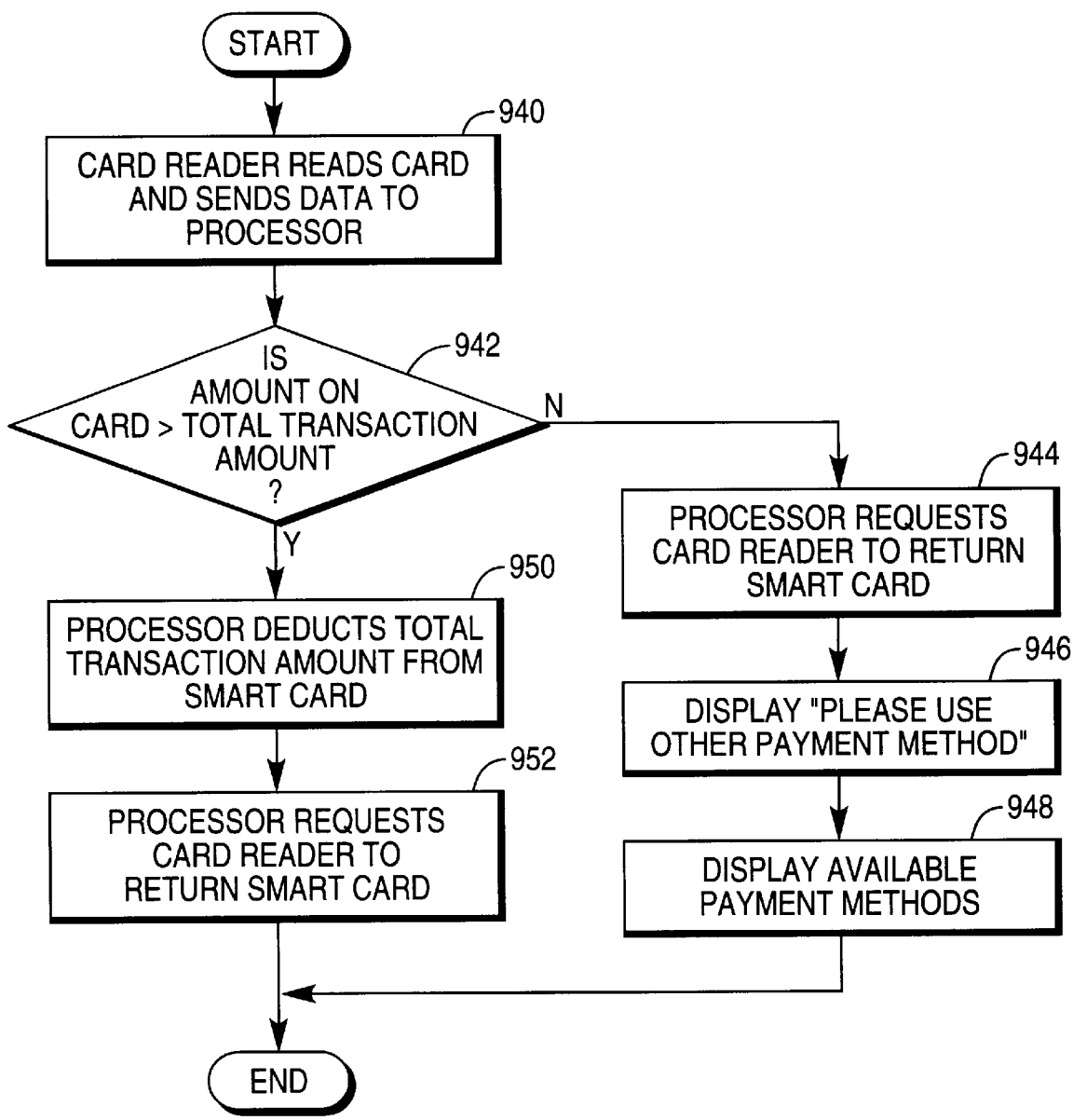
FIG. 18 is a flowchart of a program which is executed by the apparatus when the customer uses a SMART card to make payment for the purchased items to complete the checkout transaction.

If the customer elects to pay by SMART card (block 264 of FIG. 16), the customer is instructed by a message on the screen 38 to insert his or her SMART card into the card slot 52 (block 264). When the customer inserts the SMART card into the card slot 52, the apparatus 10 operates in accordance with a program which is depicted in the flowchart of FIG. 18. As shown in step 940 of FIG. 18, the card reader 50 reads information from the SMART card in response to insertion of the SMART card into the card slot 52. If the amount of available cash on the SMART card is not equal to or greater than the total transaction amount, as determined in step 942, then the program proceeds to step 944 in which the processor unit 60 sends a message to the card reader 50 to instruct the card reader to return the SMART card to the customer. The processor unit 60 then displays a message on the screen 38 indicating to the customer the that another payment method needs to be selected as shown in step 946. Also, the available payment methods are displayed on the screen 38 as indicated in step 948.

If the amount of available cash on the SMART card is at least equal to the total transaction amount, as determined in step 942, then the program proceeds to step 950 in which the processor unit 60 updates the SMART card by deducting the total transaction amount from the SMART card. The processor unit 60 then sends a signal to the card reader 50 to return the SMART card to the customer as shown in step 952. A message may also appear on the screen 38 inquiring if the customer requires cashback as already described hereinabove with respect to the use of a credit card.

Figure 19:
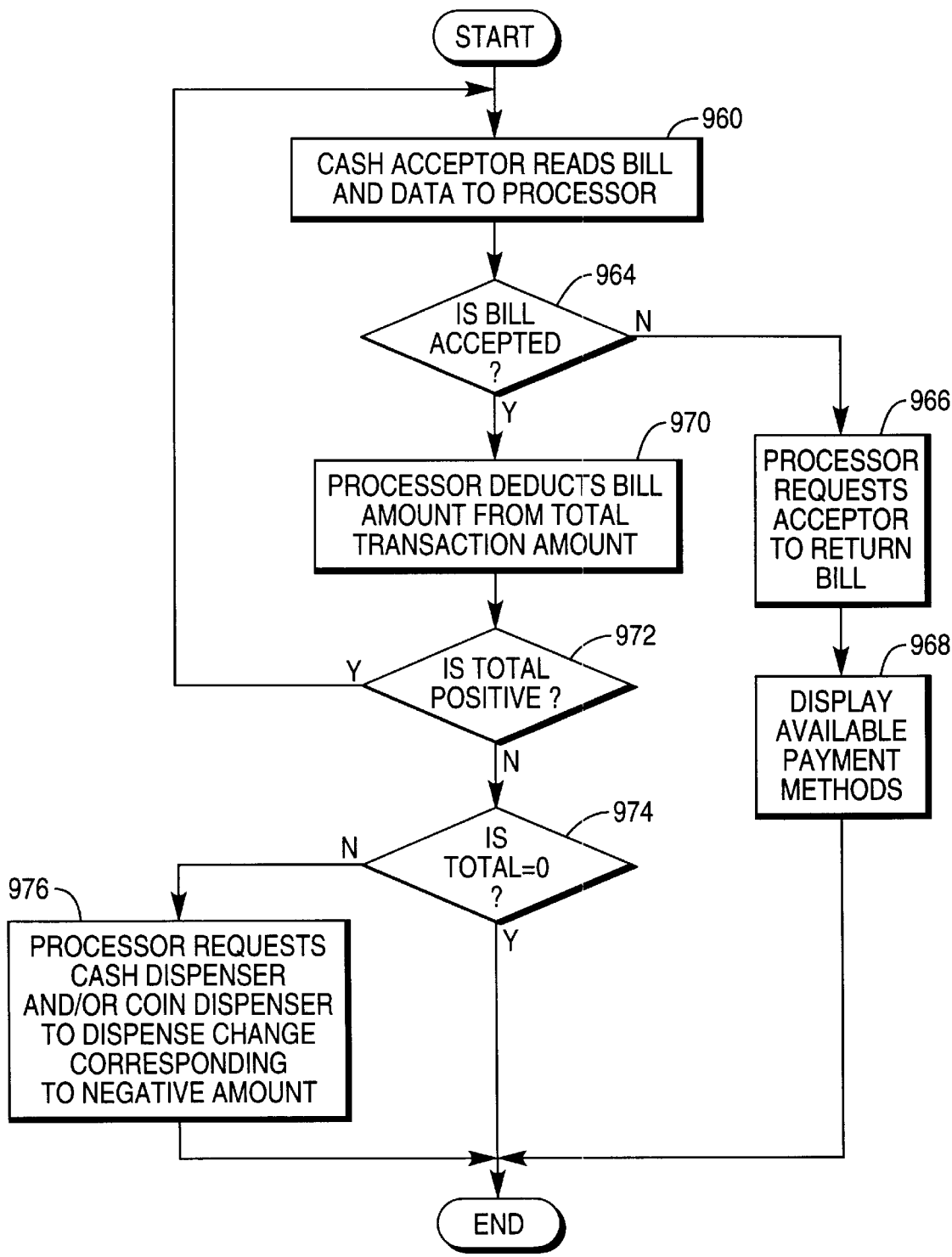
FIG. 19 is a flowchart of a program which is executed by the apparatus when the customer uses bills to make payment for the purchased items to complete the checkout transaction.

If the customer elects to pay by cash (block 268 of FIG. 216), the customer is instructed by a message on the screen 38 to insert into the input slot 134 of the cash acceptor module 22 a note or notes to a value equal to or greater than the total amount payable as shown in step 270. When the customer inserts a note into the input slot 134 of the note acceptor 22, the apparatus operates in accordance with a program which is depicted in the flowchart of FIG. 19. As shown in step 960 of FIG. 19, the note acceptor 22 reads the amount of the inserted bill sends a signal to the processor unit 60 indicative of the amount of the bill. The processor unit 60 makes a determination, as shown in step 964, as to whether the bill is acceptable. If the bill is determined to be unacceptable in step 964, then the program proceeds to step 966 in which the processor sends a signal to the cash acceptor to return the bill to the customer. The processor unit 60 also displays on the screen 38 the available payment methods as shown in step 968.

If the bill is determined to be acceptable in step 964, then the program proceeds to step 970 in which the processor unit 60 deducts the amount of the bill from the total transaction amount. If the total transaction amount after deducting the bill amount is still positive, as determined in step 972, then the customer needs to insert more cash and the program returns to the start to receive another bill. If the total transaction amount after deducting the bill amount is not positive, as determined in step 972, then the program proceeds to step 974.

In step 974, a determination is made as to whether the total transaction amount after deducting the bill amount is equal to zero. If the determination in step 974 is affirmative, then the customer has paid a cash amount equal to the total transaction amount and the program ends. If the determination in step 974 is negative, then the customer is owed some change and the program proceeds to step 976. If change is required, then a signal is sent by the processor unit 60 to the coin dispenser module 24 and/or to the cash dispenser 44 causing the appropriate amount of change to be dispensed for collection by the customer. The finalization procedure (block 84 of FIG. 3) is now completed.

When the finalization procedure in block 84 of FIG. 3 is completed, the processor unit 60 sends a signal to the security gate 12 so as to bring about opening of the gate 12. The apparatus is then reset as previously described (block 86 of FIG. 3) and returned to its idle condition (block 74 of FIG. 3). At the end of a finalization procedure in block 84 of FIG. 3, the customer takes any cash that is due to him or her by way of change or cashback. As previously described, this cash is presented to the customer through the note dispenser slot 48 of the ATM 20 and/or at the coin receptacle 61 of the coin dispenser 24. The customer also takes the receipt presented through the receipt slot 58. Finally, the customer also removes the bag 32' containing the purchased items from the rails 35, places the 32' bag in the cart 72, and proceeds through the opened security gate 12.

A photosensor device 126 (FIG. 2) located in the vicinity of the gate 12 senses when the customer and cart 72 have passed through the gate 12 and then sends a signal to the processor unit 60 which causes the gate 12 to be returned to its closed, locked condition in readiness for the next customer. After the gate operates as shown in block 85 of FIG. 3, the process flow proceeds to block 86 in which the checkout apparatus 10 is reset as represented by block 86 in FIG. 3 before returning to the idle condition (block 74).

As an additional security measure, the management of the supermarket may from time to time carry out a spot check on the contents of a cart 72 after the accompanying customer and the cart 72 have proceeded through the exit gate 12. Thus, this check will involve comparing the contents of the cart 72 with the purchased items listed on the receipt presented to the customer at the end of the relevant transaction. If such spot check results in a discrepancy being found, then if the customer is unable to give a satisfactory explanation, some action may be taken against the customer such as withdrawal or inactivation of his or her shopping card.

In general, a supermarket or other retail establishment would have a plurality of self-service checkout apparatuses as described hereinbefore. The security video cameras 36 of the various self-service checkout apparatuses would all be linked to the same remote monitoring station. In addition, the supermarket or other retail establishment would have a plurality of conventional, cashier-attended checkout counters for use, for example, by customers who do not have a customer identifying shopping card.

It should be understood that a checkout apparatus in accordance with the present invention, such as the checkout apparatus 10 described herein by way of example with reference to the accompanying drawings, has the advantage that a complete checkout transaction can be effected by a customer without the involvement of any member of staff of the relevant retail establishment. Moreover, such checkout transaction can include the dispensing of change or cashback to the customer, again without the involvement of any member of staff. However, if at any time in the course of a checkout transaction a customer requires assistance, the customer can summon the help of a member of staff by actuating an appropriate one of the function keys 40. Also, if in the course of a checkout transaction the processor unit 60 determines that a required action on the part of a customer has been omitted or incorrectly performed, then the processor unit 60 will cause an alarm signal to be sent to the monitoring station, which will normally result in a member of staff going to the checkout apparatus 10 for the purpose of investigating a possible problem.

Other advantages of the self-service checkout apparatus described herein are that the apparatus gives a customer the choice of paying by card or cash, and enables adjustments to be made if the customer has coupons or a special case card (e.g. employee card).

Another important advantage of the checkout apparatus 10 described herein is that the ATM 20 which forms an essential part of, and controls the operation of, the checkout apparatus can be used to provide all the normal services of an ATM independently of any checkout transaction. Thus, the checkout apparatus is highly cost effective, since, subject to appropriate software changes being made, a conventional ATM which provides conventional ATM services forms a substantial part of the checkout apparatus.

In regard to the self-service checkout apparatus described herein by way of example with reference to the accompanying drawings, it will be appreciated that various improvements, changes and modifications can be made without departing from the true spirit and scope of the invention. Such improvements, changes and modifications within the skill of the art to which the present invention relates are intended to be covered by the appended claims.

For example, as a security feature of the checkout apparatus 10, the bag 32' in which purchased merchandise items are placed could be supported on a weighing scale, instead of being suspended from the rods 35. Using such an arrangement, each time an item is placed in the bag 32', the weight of the item as determined by the said weighing scale and communicated to the processing unit 60 is compared by the processing unit 60 with a known weight for the item as identified in a scanning or PLU entering operation. Also, in addition to the scanner/scale 16, a hand held bar code laser scanner could be provided at the apparatus for use in scanning bulky or awkwardly shaped items. Moreover, it is contemplated that the checkout apparatus 10 could include a cheque acceptor for enabling a customer to pay for purchased items by cheque.

Further, in regard to the itemization procedure, provision could be made for handling controlled items, such as alcoholic or tobacco items, in a special manner. For example, if a scanned item is identified as being a controlled item, an alerting signal could be sent by the processing unit 60 to the monitoring station so that a check can be made using the security camera 36 that the purchase is not being made by a juvenile.

In another alternative arrangement, the coin dispenser 24 could be omitted and, instead of providing change to a customer in the form of coins, alternative compensation in the form of a printed voucher or coupon of equivalent value could be provided by the ATM 20 to the customer for use in connection with a future self-service or cashier-assisted checkout transaction. Such voucher or coupon would be printed by the print means 54 and issued to the customer through the receipt slot 58.

We claim:

1. A checkout apparatus for processing items selected by a customer for purchase, the checkout apparatus comprising:

customer operated means for identifying each item selected for purchase;

an integrated self-service terminal including payment accepting means for enabling the customer to make payment for the purchased items, cash dispensing means for providing the customer with cash by way of change, and electronic control means connected to the customer operated means and for determining the price of each item identified by the customer operated means;

the self-service terminal employing a display screen being arranged both to guide the customer through a merchandising transaction and to provide to the customer an indication of the total amount to be paid by the customer for the purchased items; and the self-service terminal providing at least one of a number of automated teller machine (ATM) services independently of the processing of items selected for purchase, the number of ATM services including (i) allowing a customer to withdraw cash from a bank account, (ii) allowing a customer to shift money between bank accounts, and (iii) allowing a customer to check the amount of money in a bank account.

2. A checkout apparatus according to claim 1, wherein the payment accepting means includes card reading means for enabling a customer to make payment of the total price by means of a debit card or credit card, the card reading means also being arranged to read a customer identifying card used by a customer when carrying out an ATM transaction before the processing of items selected for purchase.

3. A checkout apparatus according to claim 1, further comprising a signature pad for providing a digitized representation of a customer's signature, the digitized representation being stored by the electronic control means.

4. A checkout apparatus according to claim 1, wherein the payment accepting means also includes a currency note acceptor means for enabling a customer to make payment of the total price by cash.

5. A checkout apparatus according to claim 1, wherein the self-service terminal includes a coin dispenser arranged to dispense change due to a customer who has made payment.

6. A checkout apparatus according to claim 1, further comprising a security gate which normally closes a customer exit from the checkout apparatus, the electronic control means being arranged to open the security gate in response to payment by a customer, means being provided for bringing about closure to the security gate after the customer has passed through the exit away from the checkout apparatus.

7. A checkout apparatus according to claim 2, wherein the card reading means is arranged to read a further customer identifying card used by a customer at the commencement of a checkout transaction.

8. A self-checkout apparatus for processing items selected by a customer for purchase, and a customer operated bar code scanner for identifying each item selected for purchase, the self-checkout apparatus comprising:

a self-service terminal providing integrated automated teller machine and point of sale functionality which includes a payment accepting mechanism for enabling the customer to make payment for the purchased items, a cash dispenser arranged to provide the customer with cash by way of change or as part of an automated teller machine transaction, and an electronic controller which is connected to said customer operated bar code scanner and which is arranged to determine the price of each item identified by said customer operated barcode scanner, said self-service terminal being arranged to provide to the customer an indication of the total amount to be paid by the customer for the purchased items; and a common display screen arranged to display messages for guiding a customer through both checkout transactions, and automated teller machine transactions.

9. The self-checkout apparatus of claim 8, wherein said customer bar code scanner comprises a laser scanner arranged to scan a bar code carried by an item to be purchased and arranged to send a signal identifying the scanned item to said electronic controller, said electronic controller being further operable to cause said common display screen to display an identification of the scanned item together with its price as items are scanned.

10. The self-checkout apparatus of claim 8 further comprising a scale for weighing an item to be purchased, said scale being operative to send to said electronic controller a signal indicative of the weight of the weighed item; and a customer operated data entry mechanism for enabling the customer to key in data identifying the weighed item, said electronic controller being further operable to cause said common display screen to display an identification of the weighed item together with its price as the customer keys in data identifying weighed items.

11. The self-checkout apparatus of claim 10, wherein said electronic controller is further operable to cause said common display screen to display to a customer information enabling the customer to determine a code identifying the weighed item.

12. The self-checkout apparatus of claim 8, wherein said self-service terminal provides automated teller machine (ATM) services independently of the processing of items selected for purchase.

13. The self-checkout apparatus of claim 8, wherein said self-service terminal includes a printer arranged to print a receipt listing all items purchased by a customer together with the prices of the items purchased and the total price payable by the customer, said self-service terminal being arranged to issue said receipt to the customer in response to the payment by the customer of said total price using a payment acceptor.

14. The self-checkout apparatus of claim 13 wherein said printer is also operable to printout a receipt for an automated teller machine transaction.

15. The self-checkout apparatus of claim 8, further comprising a payment acceptor which includes a card reader for enabling a customer to make payment by means of a debit card or credit card, said card reader also being arranged to read a customer identifying card used by a customer when carrying out an ATM transaction independently of the processing of items selected for purchase.

16. The self-checkout apparatus of claim 8, further comprising a signature pad for providing a digitized representation of a customer's signature, said digitized representation being stored by said electronic controller in a memory.

17. The self-checkout apparatus of claim 15, wherein said payment acceptor also includes a currency note acceptor for enabling a customer to make payment of said total price by cash.

18. The self-checkout apparatus of claim 8, wherein said terminal further comprises a coin dispenser arranged to dispense change due to a customer.

19. The self-checkout apparatus of claim 8, further comprising a security gate which normally closes a customer exit from said self-checkout apparatus, said electronic controller being operable to open said security gate in response to payment by a customer.

20. The self-checkout apparatus of claim 15, wherein said card reader is further operable to read a further customer identifying card used by a customer at the commencement of a checkout transaction, and said electronic controller is operable so that a checkout transaction will only be enabled if the further customer identifying card is successfully read.

21. The self-checkout apparatus of claim 8, wherein said self-service terminal further comprises a coupon acceptor which is connected to said electronic controller and which is operable to read information carried on a predetermined type of coupon inserted in said coupon acceptor by a customer, said electronic controller being arranged to adjust the total amount payable by the customer in response to information read by said coupon acceptor.

22. The self-checkout apparatus of claim 8, further comprising a video surveillance camera connected to a remote monitoring station and arranged to survey a checkout transaction carried out by a customer using said self-checkout apparatus.

23. A method of completing both banking and sales transactions in a retail establishment utilizing an integrated self-service checkout terminal comprising the steps of:

displaying a first set of instructions on a common display of the integrated self-checkout terminal while the integrated self-service checkout terminal is in an idle state;

recording an indication by the customer to start the transaction by an input device in the integrated self-service checkout terminal;

displaying on the common display a second set of instructions for the customer to indicate whether the customer wishes to make the transaction a banking transaction or a shopping transaction;

recording a response by the customer by the input device; and completing the transaction by the integrated self-checkout terminal.

24. The method of claim 23, wherein, if the response is a shopping transaction, the step of completing the transaction comprises the steps of:

displaying a third set of instructions on the common display for instructing the customer how to enter items including a last item into the transaction by scanning them with a bar code reader, weighing them with a scale, or using the input device;

recording the entry of items including the last item into the transaction in response to scanning, weighing, or using the input device;

displaying a fourth set of instructions on the common display in response to the last item being recorded for instructing the customer to choose one of a number of methods of paying for the items, the methods of paying including cash and credit;

recording the entry of a payment choice of the customer; and receiving payment from the customer using the chosen method of payment by the integrated self-checkout terminal.

25. The method of claim 23, wherein, if the response is a banking transaction, the step of completing comprises the steps of:

displaying a third set of instructions on the common display for instructing the customer how to complete the banking transaction;

displaying a fourth set of instructions on the display to choose one of a number of types of banking transactions, including cash deposit and cash withdrawal transactions;

recording a customer choice of type of banking transaction by the integrated self-checkout terminal;

completing the chosen type of banking transaction by the integrated self-checkout terminal;

displaying a fifth set of instructions for the customer to indicate whether the customer wishes to conduct a shopping transaction; and recording a response by the customer entered utilizing the input device.

26. The method of claim 23, further comprising the steps of:

opening a security gate after the transaction is completed; and displaying the first set of instructions on the common display of the integrated self-checkout terminal to return to an idle state.

27. The method of claim 23 further comprising the step of:

printing both banking and shopping transaction receipts utilizing a single printer in the integrated self-service checkout tenninal.

28. The method of claim 23 further comprising the step of:

entering transaction data for both banking and shopping transaction utilizing a single data entry device in the integrated self-service checkout terminal.

* * * * *